United States Patent
Zhang et al.

(10) Patent No.: US 10,676,493 B2
(45) Date of Patent: Jun. 9, 2020

(54) PHOSPHORUS-CONTAINING COMPOUND, PHOSPHORUS-CONTAINING FLAME RETARDANT, PREPARATION METHOD THEREOF, AND ARTICLE MADE THEREFROM

(71) Applicant: Elite Electronic Material (Kunshan) Co., Ltd, Kunshan (CN)

(72) Inventors: Yan Zhang, Kunshan (CN); Rongtao Wang, Kunshan (CN); Mingsheng Yuan, Kunshan (CN); Ningning Jia, Kunshan (CN)

(73) Assignee: ELITE ELECTRONIC MATERAL (KUNSHAN) CO., LTD., Kunshan, Jiangsu Province (CN)

( * ) Notice: Subject to any disclaimer, the term of this patent is extended or adjusted under 35 U.S.C. 154(b) by 89 days.

(21) Appl. No.: 16/158,082

(22) Filed: Oct. 11, 2018

(65) Prior Publication Data

US 2020/0002365 A1 Jan. 2, 2020

(30) Foreign Application Priority Data

Jun. 28, 2018 (CN) .......................... 2018 1 0688817

(51) Int. Cl.
*C07F 9/6571* (2006.01)
*C09K 21/12* (2006.01)
*C08K 5/5313* (2006.01)
*C08J 5/24* (2006.01)
*C08L 71/12* (2006.01)

(52) U.S. Cl.
CPC .......... *C07F 9/657172* (2013.01); *C08J 5/24* (2013.01); *C08K 5/5313* (2013.01); *C08L 71/126* (2013.01); *C09K 21/12* (2013.01); *C08J 2371/12* (2013.01); *C08J 2425/10* (2013.01)

(58) Field of Classification Search
CPC ...... C08J 5/24; C08J 2371/12; C08J 2425/10; C08L 71/126; C08K 5/5313; C09K 21/12; C08G 65/4006; C07F 9/657172
USPC .......................................................... 524/119
See application file for complete search history.

(56) References Cited

U.S. PATENT DOCUMENTS

2014/0249253 A1* 9/2014 Worku ................. C08K 5/5313
523/451
2017/0022228 A1* 1/2017 Hu .......................... C08G 79/04

* cited by examiner

*Primary Examiner* — Doris L Lee
(74) *Attorney, Agent, or Firm* — Muncy, Geissler, Olds & Lowe, P.C.

(57) ABSTRACT

A phosphorus-containing compound, a phosphorus-containing flame retardant, and a preparation method thereof are provided. Also provided is a resin composition which comprises the phosphorus-containing flame retardant and an unsaturated bond-containing resin. The resin composition may be used to make various articles, such as a prepreg, a resin film, a resin-coated copper, a laminate or a printed circuit board, and achieves improvement in at least one, more or all properties including resin filling property of prepreg, flame retardancy, alkali resistance, glass transition temperature, thermal dimensional stability (ratio of dimensional change under heat), thermal resistance after moisture absorption, peeling strength, dielectric constant and dissipation factor.

15 Claims, 1 Drawing Sheet

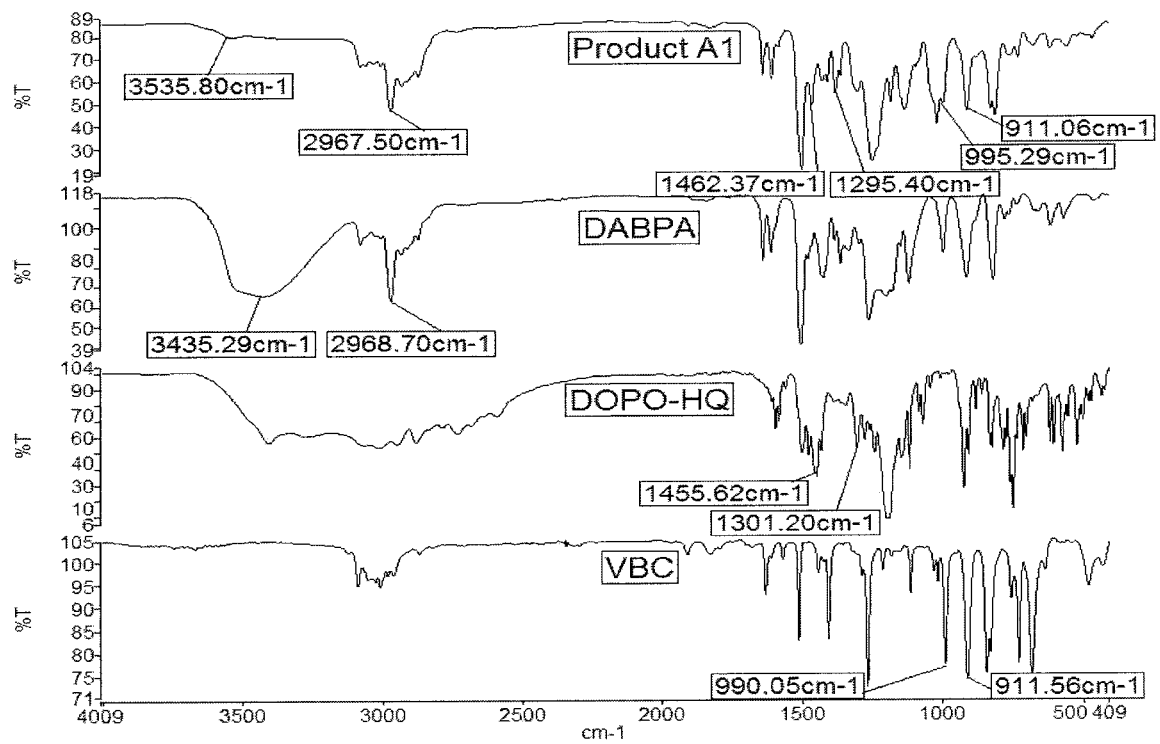

PHOSPHORUS-CONTAINING COMPOUND, PHOSPHORUS-CONTAINING FLAME RETARDANT, PREPARATION METHOD THEREOF, AND ARTICLE MADE THEREFROM

CROSS-REFERENCE TO RELATED APPLICATION

This application claims the priority benefits of China Patent Application No. 201810688817.0, filed on Jun. 28, 2018, the entirety of which is hereby incorporated by reference herein and made as a part of this specification.

BACKGROUND

1. Field of the Disclosure

The present disclosure relates to a phosphorus-containing compound, a phosphorus-containing flame retardant and a preparation method thereof, a resin composition comprising the same, and an article made therefrom. More particularly, the present disclosure relates to a phosphorus-containing flame retardant and a resin composition useful for preparing an article such as a prepreg, a resin film, a resin-coated copper, a laminate or a printed circuit board.

2. Description of Related Art

As the information processing in mobile communication, servers, cloud storage and other electronic products has been incessantly directed toward high frequency signal transmission and high speed digitalization, materials used in circuit boards have to meet higher standards. In order to maintain transmission rate and integrity of signal transmission, materials used for making substrates of circuit boards must satisfy the requirements of low dielectric constant (Dk) and low dielectric loss tangent or dissipation factor (Df). Meanwhile, to ensure normal operation of electronic components under a high temperature and high humidity environment, circuit boards also need to have the features of thermal resistance, moisture resistance and flame retardancy. On the other hand, halogen-free materials have become the mainstream in the electronic industry in order to comply with the global trend of environmental protection and green regulations. Therefore, there is a need for developing materials suitable for a high performance halogen-free printed circuit board (PCB) with high flame retardancy.

Conventionally, halogen-free laminates and print circuit boards, in order to meet the UL94 V-0 flame retardancy, usually contains a phosphorus-containing flame retardant in the resin composition; preferred phosphorus-containing flame retardants are 9,10-dihydro-9-oxa-10-phosphaphenanthrene-10-oxide (DOPO) derivates, such as 2-(10H-9-oxa-10-phospha-1-phenanthryl)hydroquinone phosphorus oxide (DOPO-HQ), used as an addition type flame retardant, which has higher melting point and lower dimensional change under heat but undesirably has poor thermal resistance after moisture absorption and tends to cause delamination under high temperature. While DOPO-containing phenol novolac resin may participate in the curing process to increase the glass transition temperature of the laminate and improve thermal resistance after moisture absorption, the presence of hydroxyl group in the molecular structure causes poor dielectric constant and dissipation factor (i.e., high Dk and Df). Conventionally, a DOPO-modified polyphenylene ether resin has been used to lower dielectric properties and improve thermal resistance of a laminate; however, the DOPO-modified polyphenylene ether resin has low phosphorus content and unsatisfactory flame retardancy as well as problems associated with low peel strength or peeling strength (a.k.a. peeling strength between a copper foil and an outer insulation layer of a copper-clad laminate) with respect to copper foils and low resin filling property of prepregs.

SUMMARY

In view of the problems facing prior arts, particularly one or more technical problems associated with conventional materials failing to meet the demands of prepreg resin filling property, laminate flame retardancy, low dielectric constant and low dissipation factor, high peel strength, high glass transition temperature, low ratio of dimensional change, thermal resistance after moisture absorption, alkali resistance and so on, the present disclosure provides a phosphorus-containing compound represented by Formula (1):

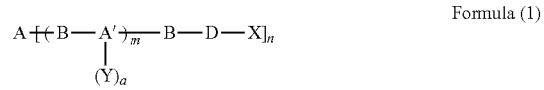

Formula (1)

wherein m is an integer of 0-50, n is an integer of 2-25, and a is an integer of 0-23;

A and A' individually represent a group derived from dehydrogenation of hydroxyl group of a diphenol or a polyphenol;

B represents a group derived from dechlorination of a dichloride compound;

D represents a group derived from dehydrogenation of hydroxyl group of a DOPO-containing diphenol or a DOPO-containing polyphenol;

X individually represent a double bond-containing functional group or hydrogen, and not all X are hydrogen at the same time;

Y may be not present, individually represent a group of Formula (2), or be a hydrogen atom;

Formula (2)

wherein q is an integer of 0-20, and A', B, D, and X are as defined in Formula (1);

preferably, A and A' individually have a number average molecular weight (Mn) of less than or equal to 1200.

In one embodiment, A and A' individually comprise a group represented by Formula (3) to Formula (23) or a combination thereof, wherein p is an integer of 0-23, preferably a group represented by Formula (3), Formula (4), Formula (5), Formula (6) or a combination thereof:

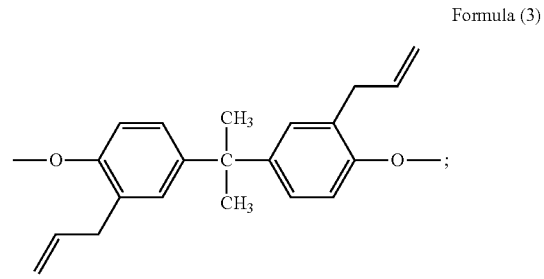

Formula (3)

-continued
Formula (4)
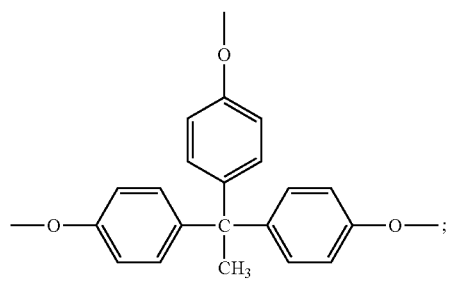
Formula (5)
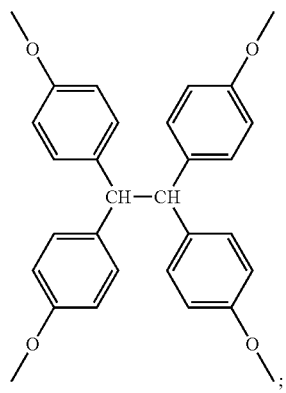
Formula (6)
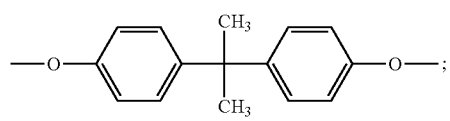
Formula (7)
Formula (8)
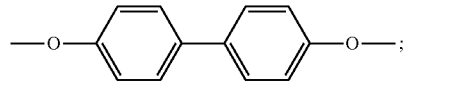
Formula (9)
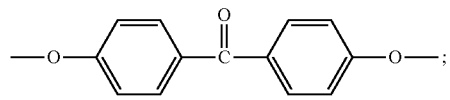
Formula (10)
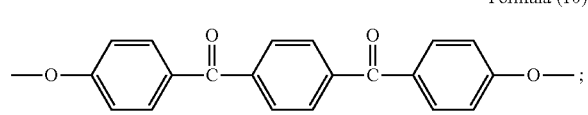
Formula (11)
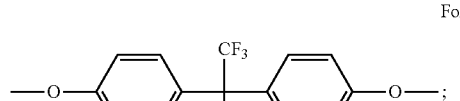
Formula (12)
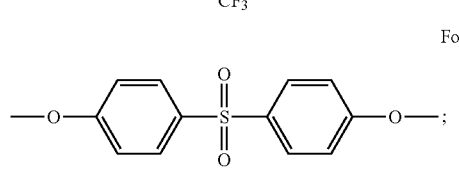
-continued
Formula (13)
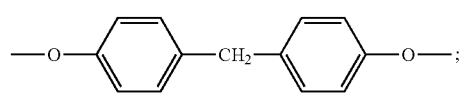
Formula (14)
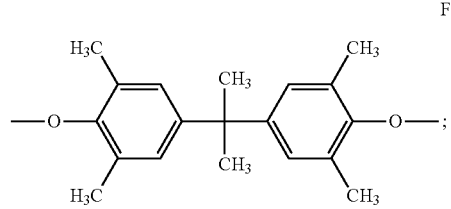
Formula (15)
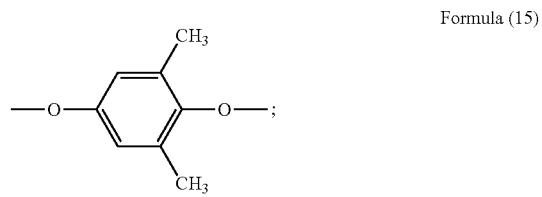
Formula (16)
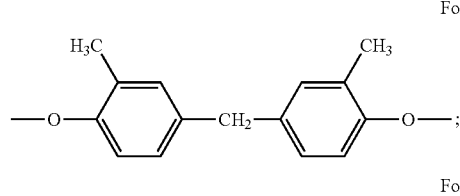
Formula (17)
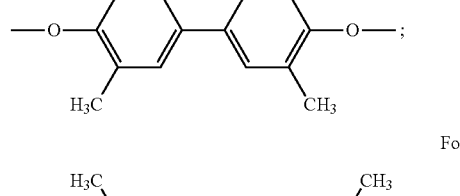
Formula (18)
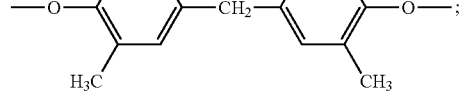
Formula (19)
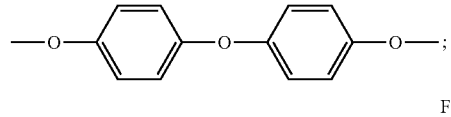
Formula (20)
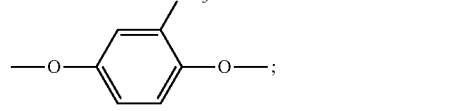
Formula (21)
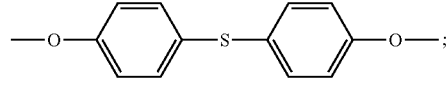

-continued

Formula (22)

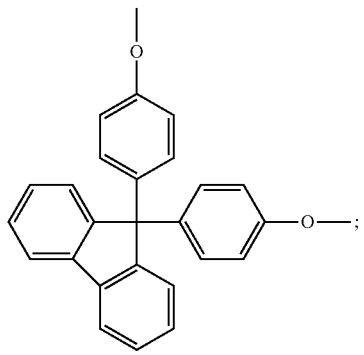

Formula (23)

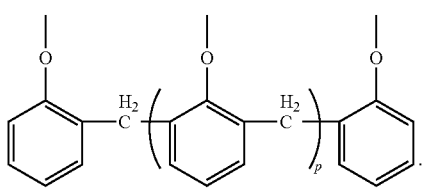

In one embodiment, B comprises a group represented by Formula (24), Formula (25), Formula (26), or a combination thereof:

Formula (24)

Formula (25)

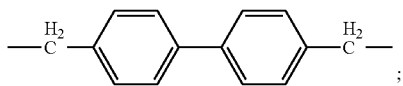

Formula (26)

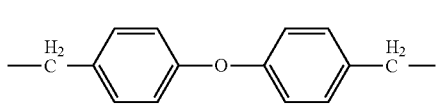

In one embodiment, D comprises a group represented by Formula (27), Formula (28), or a combination thereof:

Formula (27)

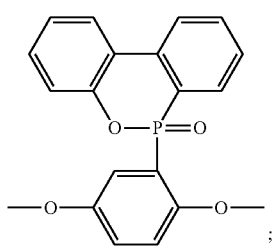

Formula (28)

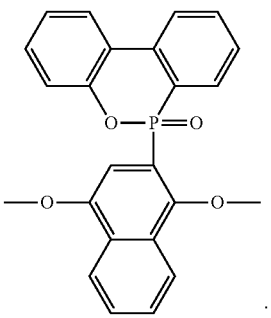

In one embodiment, each X individually represents any one of Formula (29), Formula (30) and Formula (31):

Formula (29)

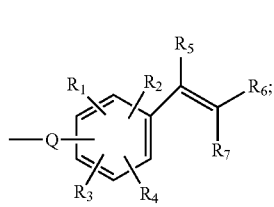

Formula (30)

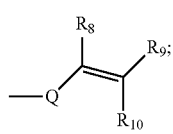

Formula (31)

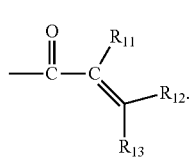

Wherein $R_1$ to $R_{13}$ each represent any one or more of hydrogen, halogen, an alkyl group or a haloalkyl group, and Q is a covalent bond or a functional group with at least one carbon atom; preferably, Q represents methylene.

Preferably, the phosphorus-containing compound of the present disclosure comprises any one of Formula (32) to Formula (38):

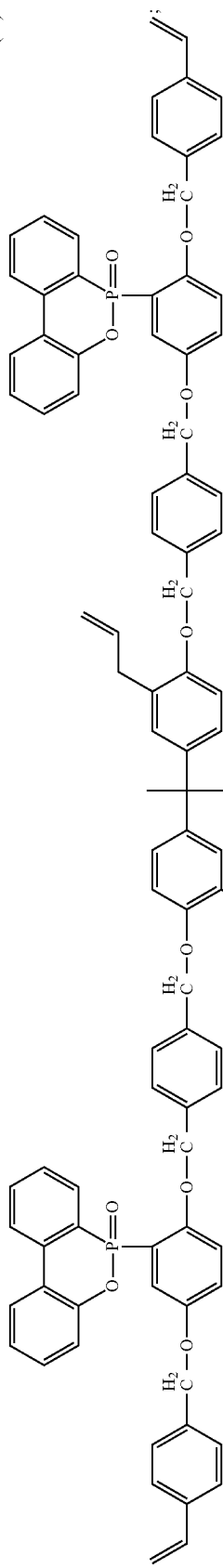
Formula (32)
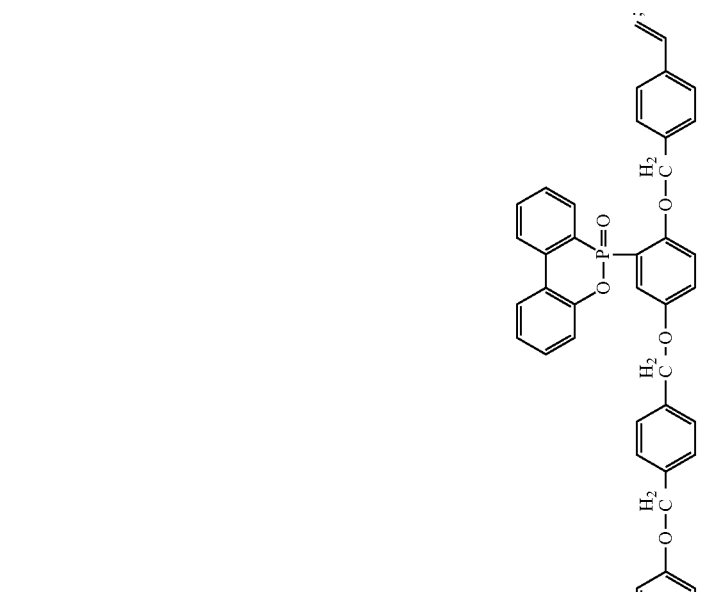
Formula (33)

-continued
Formula (34)
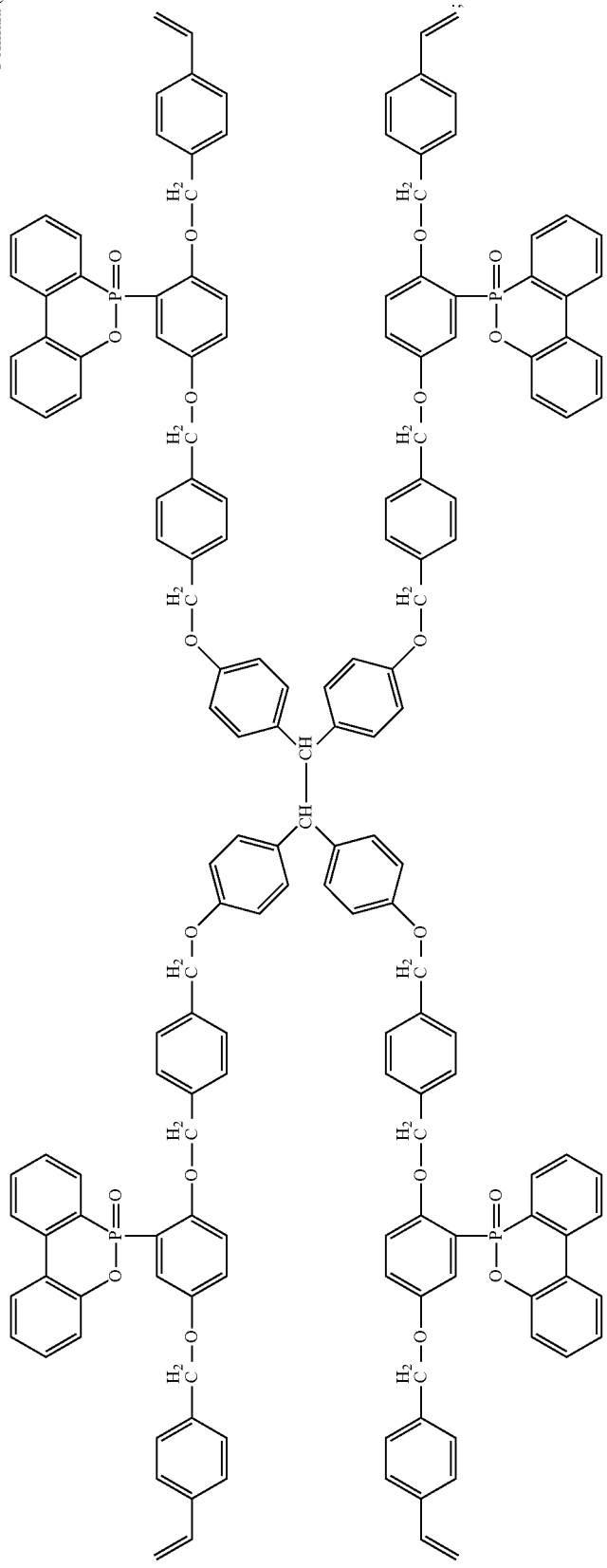
Formula (35)
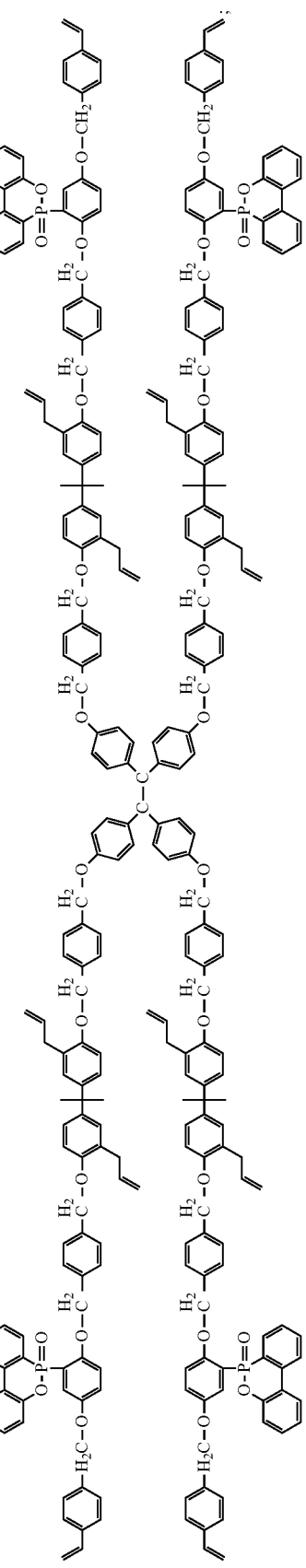

-continued
Formula (36)
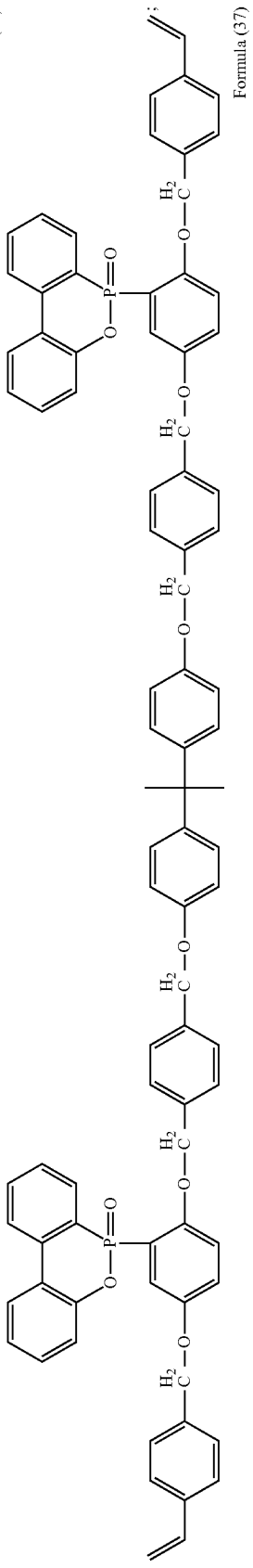
Formula (37)
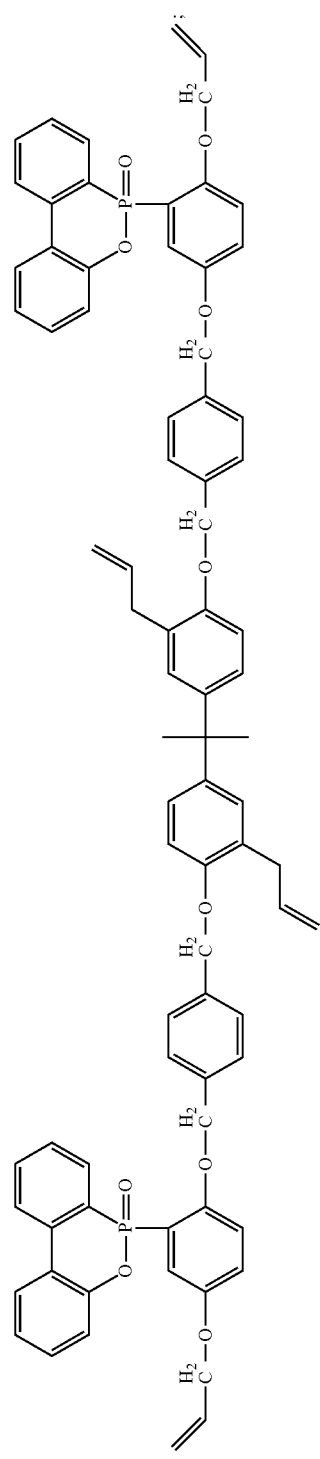
Formula (38)
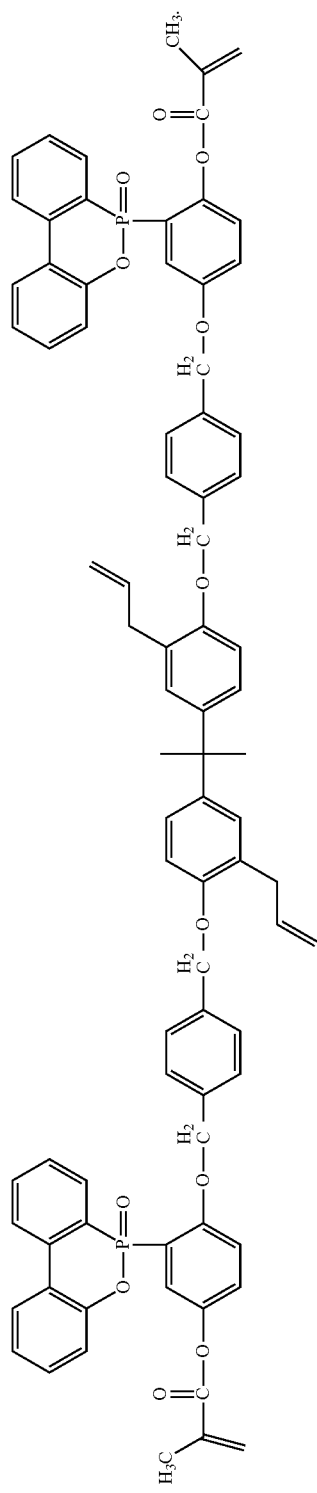

The present disclosure further provides a phosphorus-containing flame retardant comprising any one or more of the aforesaid phosphorus-containing compounds.

The present disclosure further provides a resin composition comprising the aforesaid phosphorus-containing flame retardant and an unsaturated bond-containing resin.

Examples of the unsaturated bond-containing resin are not particularly limited and may comprise various unsaturated bond-containing resins known in the art, including but not limited to divinylbenzene (DVB), bis(vinylbenzyl) ether (BVBE), 1,2-bis(vinylphenyl) ethane (BVPE), triallyl isocyanurate (TRIC), prepolymer of triallyl isocyanurate (pre-polymer TAIC), triallyl cyanurate (TAC), prepolymer of triallyl cyanurate (pre-polymer TAC), 1,2,4-trivinyl cyclohexane (TVCH), vinyl benzyl maleimide (VBM), diallyl bisphenol A (DABPA), styrene, acrylate (e.g., methacrylate, tricyclodecane dimethacrylate or trimethacrylate), vinyl-containing polyphenylene oxide resin, maleimide resin, polyolefin, or a combination thereof.

Unless otherwise specified, the aforesaid unsaturated bond-containing resin may be present as a monomer, an oligomer, a polymer, a combination thereof or a prepolymer thereof. For example, the unsaturated bond-containing resin may comprise one or more monomers, oligomers, polymers, prepolymers or any combination thereof.

In addition to the aforesaid phosphorus-containing flame retardant and unsaturated bond-containing resin, the resin composition may optionally further comprise epoxy resin, cyanate ester resin, phenolic resin, benzoxazine resin, styrene maleic anhydride resin, polyester, amine curing agent, polyamide, polyimide or a combination thereof.

In addition to the aforesaid phosphorus-containing flame retardant and unsaturated bond-containing resin, the resin composition may optionally further comprise flame retardant, inorganic filler, curing accelerator, solvent, silane coupling agent, surfactant, coloring agent, toughening agent or a combination thereof.

For example, the resin composition may comprise 5 parts by weight to 40 parts by weight of the phosphorus-containing flame retardant and 50 parts by weight to 100 parts by weight of the unsaturated bond-containing resin.

For example, the resin composition may comprise 10 parts by weight to 30 parts by weight of the phosphorus-containing flame retardant and 50 parts by weight to 100 parts by weight of the unsaturated bond-containing resin.

The resin compositions of various embodiments may be useful for making different articles, including but not limited to a prepreg, a resin film, a resin-coated copper, a laminate or a printed circuit board.

The present disclosure further provides a method of preparing the aforesaid phosphorus-containing flame retardant, comprising: reacting a diphenol or a polyphenol with a dichloride compound to obtain a first intermediate; then adding a metal salt of a DOPO-containing diphenol or a DOPO-containing polyphenol for reaction to obtain a second intermediate; and then adding a vinyl-containing halide for reaction so as to obtain the phosphorus-containing flame retardant.

The present disclosure further provides a method of preparing the aforesaid phosphorus-containing flame retardant, comprising: reacting a first diphenol or polyphenol with a dichloride compound to obtain a first intermediate; then adding a second diphenol or polyphenol for reaction to obtain a second intermediate; then adding a metal salt of a DOPO-containing diphenol or a DOPO-containing polyphenol for reaction to obtain a third intermediate; and then adding a vinyl-containing halide for reaction so as to obtain the phosphorus-containing flame retardant.

In the aforesaid method of preparing the phosphorus-containing flame retardant, during the reaction of a diphenol or a polyphenol with a dichloride compound, a phase transfer catalyst may be added.

BRIEF DESCRIPTION OF THE DRAWINGS

The sole FIGURE illustrates the FTIR spectrum of Product A1.

DETAILED DESCRIPTION OF EMBODIMENTS

To enable those skilled in the art to further appreciate the features and effects of the present disclosure, words and terms is contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

As used herein, "a," "an" or similar expression is employed to describe elements and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features or conditions presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly all subranges defined by integers, as well as disclosing all individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or FIGURES have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

The following embodiments and examples are illustrative in nature and are not intended to limit the present disclosure and its application. In addition, the present disclosure is not bound by any theory described in the background and summary above or the following embodiments or examples.

Phosphorus-Containing Compound

A primary object of the present disclosure is to provide a phosphorus-containing compound represented by Formula (1):

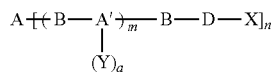

Formula (1)

wherein m is an integer of 0-50, n is an integer of 2-25, and a is an integer of 0-23;

A and A' individually represent a group derived from dehydrogenation of hydroxyl group of a diphenol or a polyphenol;

B represents a group derived from dechlorination of a dichloride compound;

D represents a group derived from dehydrogenation of hydroxyl group of a DOPO-containing diphenol or a DOPO-containing polyphenol;

X individually represent a double bond-containing functional group or hydrogen, and not all X are hydrogen at the same time;

Y may be not present, individually represent a group of Formula (2), or be a hydrogen atom;

Formula (2)

wherein q is an integer of 0-20, and A', B, D, and X are as defined in Formula (1).

Preferably, the groups derived from dehydrogenation of hydroxyl group of a diphenol or a polyphenol represented by A and A' individually have a number average molecular weight (Mn) of less than or equal to 1200.

In one embodiment, A and A' individually comprise a group represented by Formula (3) to Formula (23) or a combination thereof, wherein p is an integer of 0-23, preferably a group represented by Formula (3), Formula (4), Formula (5), Formula (6) or a combination thereof:

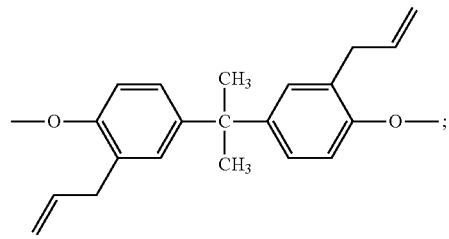

Formula (3)

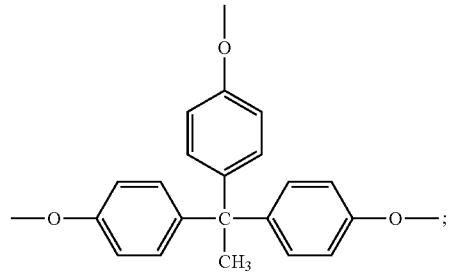

Formula (4)

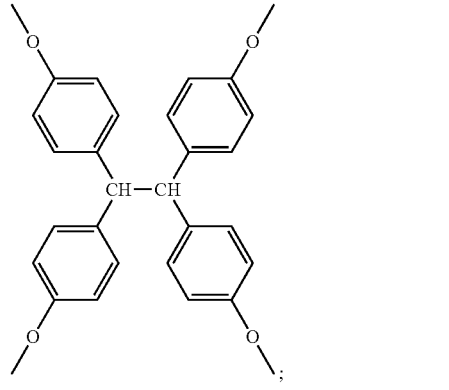

Formula (5)

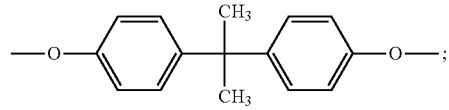

Formula (6)

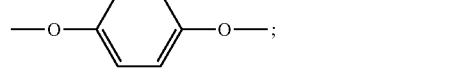

Formula (7)

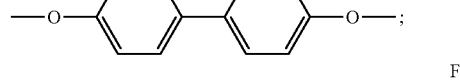

Formula (8)

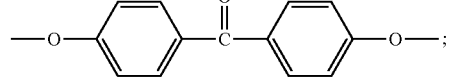

Formula (9)

Formula (10)
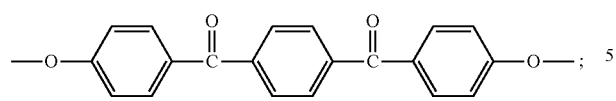
Formula (11)
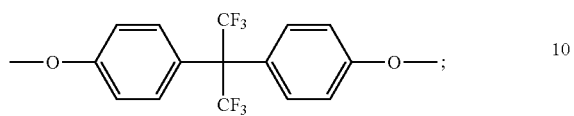
Formula (12)
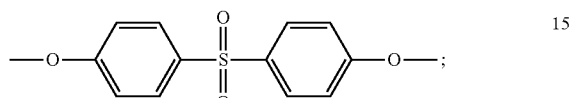
Formula (13)
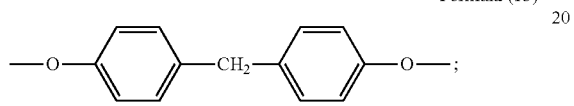
Formula (14)
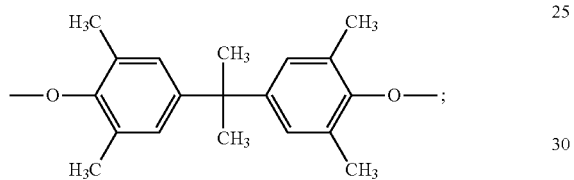
Formula (15)
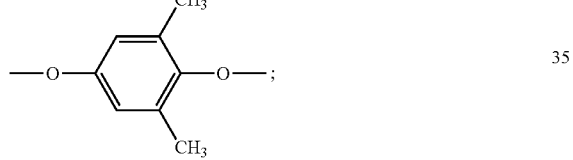
Formula (16)
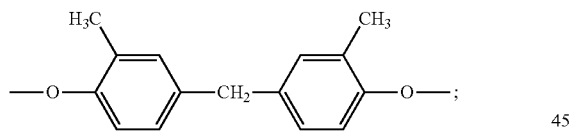
Formula (17)
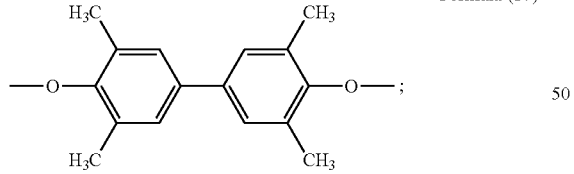
Formula (18)
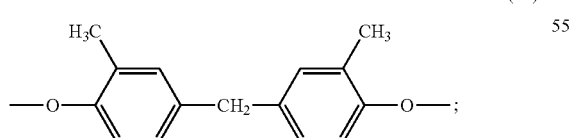
Formula (19)
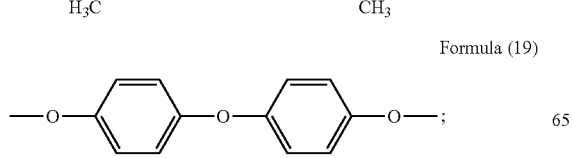
Formula (20)
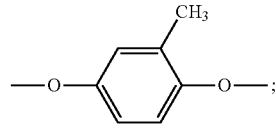
Formula (21)
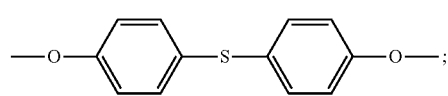
Formula (22)
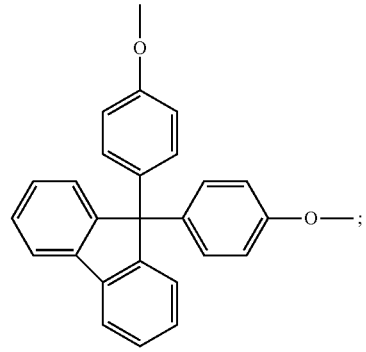
Formula (23)
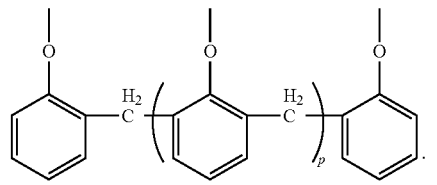
In one embodiment, B comprises a group represented by Formula (24), Formula (25), Formula (26), or a combination thereof:
Formula (24)
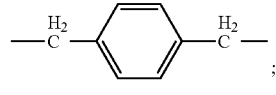
Formula (25)
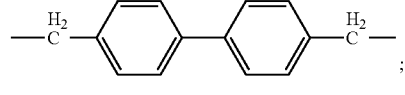
Formula (26)
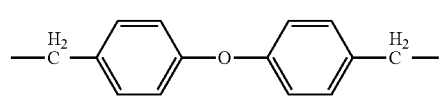
In one embodiment, D comprises a group represented by Formula (27), Formula (28), or a combination thereof:
Formula (27)
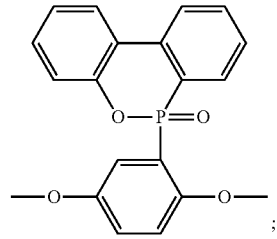

Formula (28)

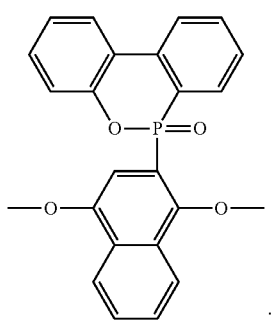

In one embodiment, each X individually represents any one of Formula (29), Formula (30) and Formula (31):

Formula (29)

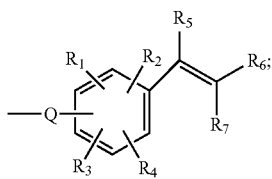

Formula (30)

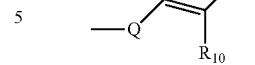

Formula (31)

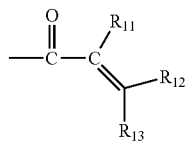

Wherein $R_1$ to $R_{13}$ each represent any one or more of hydrogen, halogen, an alkyl group or a haloalkyl group, and Q is a covalent bond or a functional group with at least one carbon atom; preferably, Q represents methylene.

Preferably, the phosphorus-containing compound of the present disclosure comprises any one of Formula (32) to Formula (38):

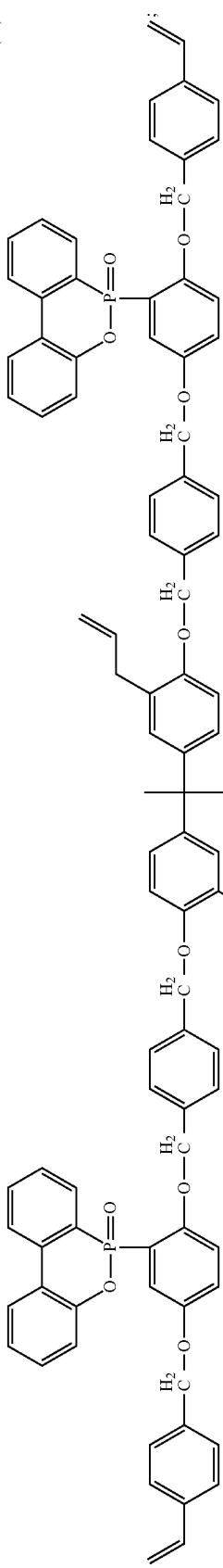
Formula (32)
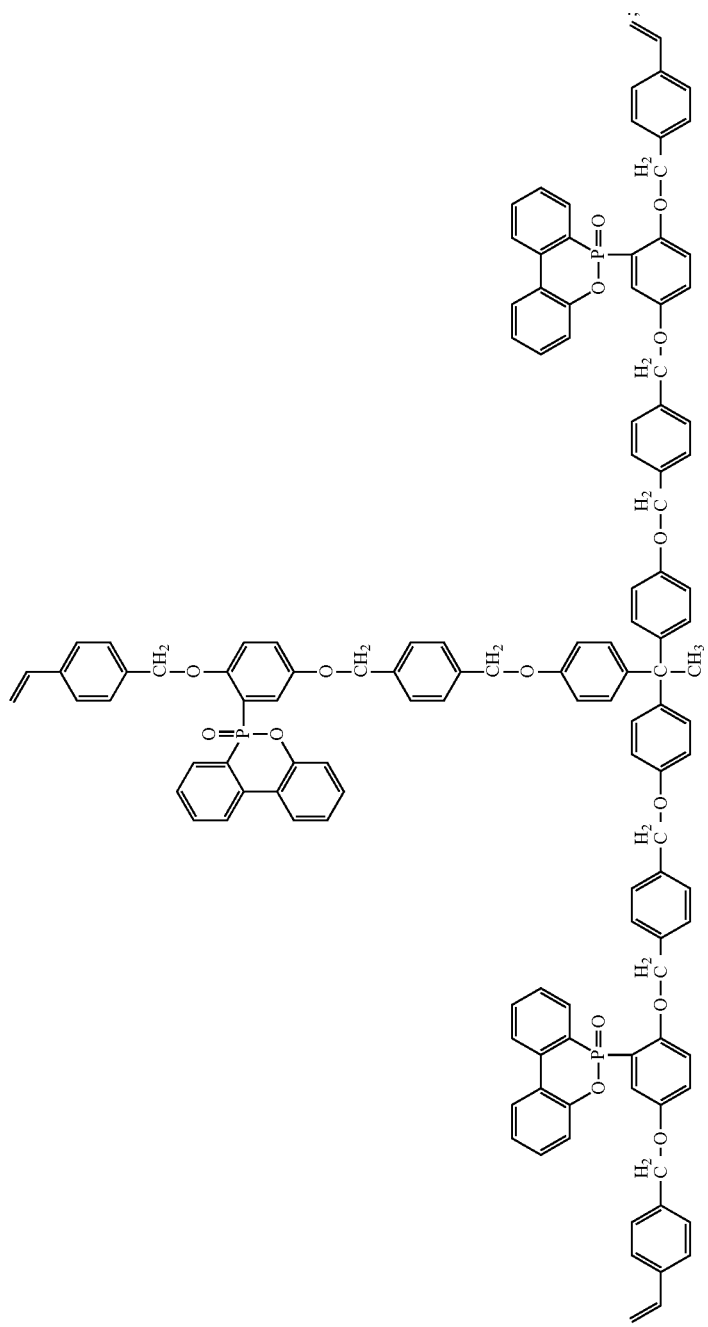
Formula (33)

-continued
Formula (34)
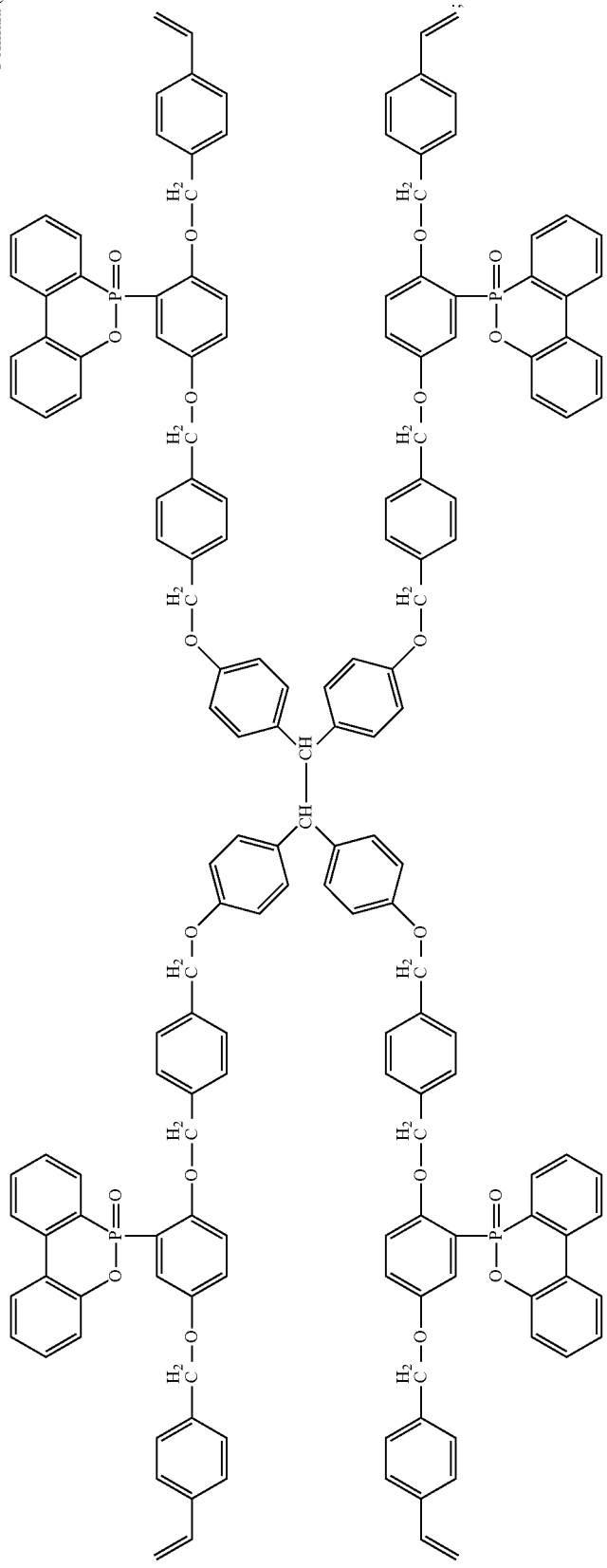
Formula (35)
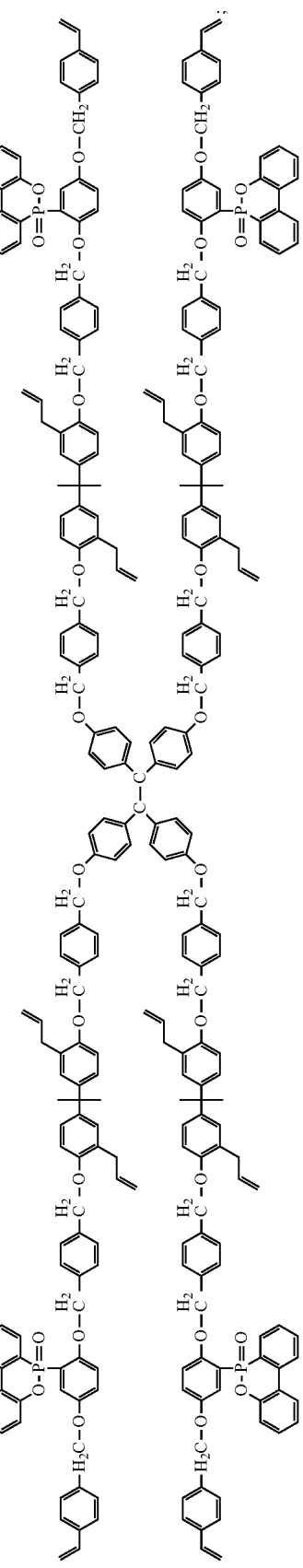

-continued
Formula (36)
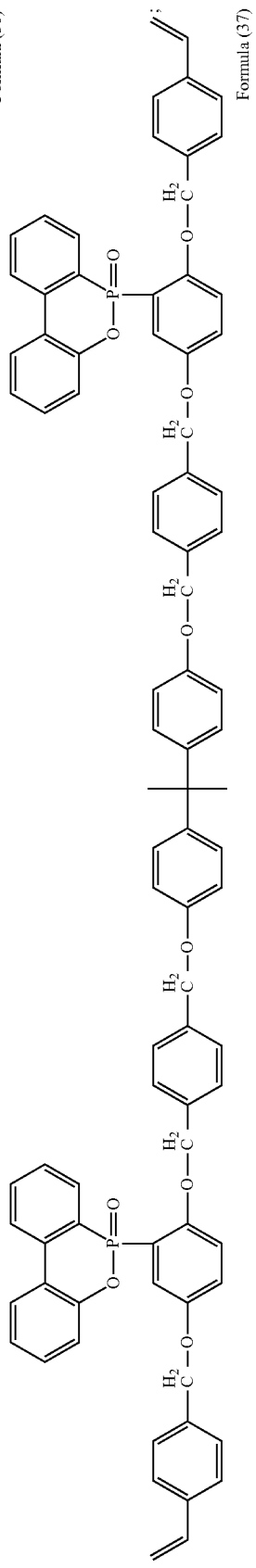
Formula (37)
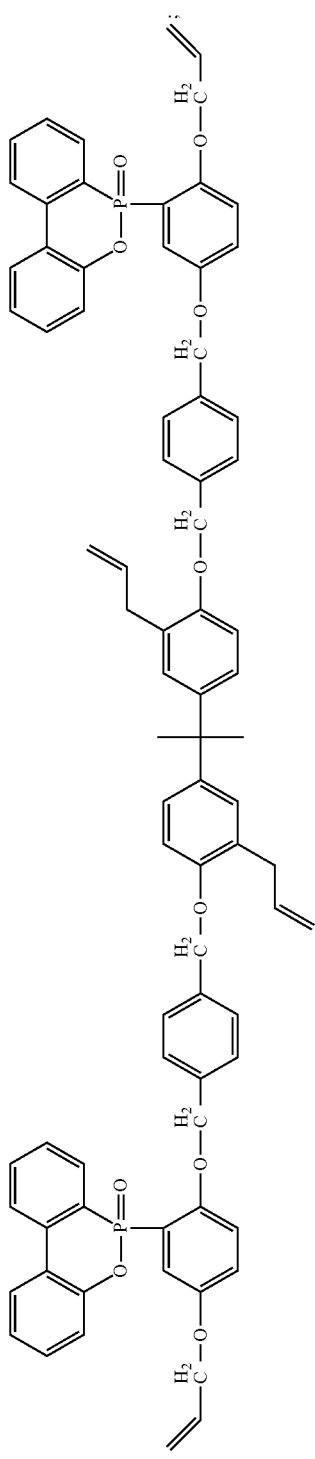
Formula (38)
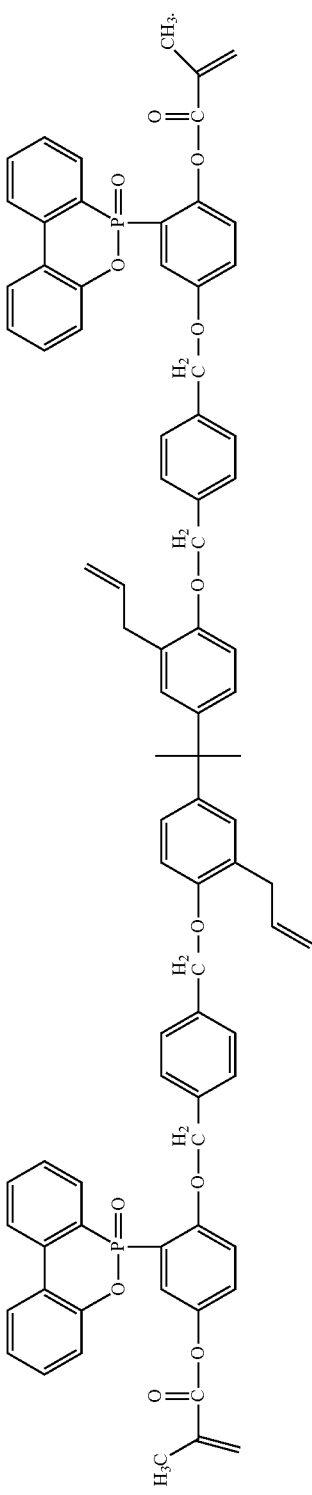

Phosphorus-Containing Flame Retardant

The present disclosure further provides a phosphorus-containing flame retardant comprising any one or more of the aforesaid phosphorus-containing compounds.

Method of Preparing Phosphorus-containing Flame Retardant

The method comprises: first reacting a diphenol or a polyphenol with a dichloride compound; then adding a metal salt of a DOPO-containing diphenol or a DOPO-containing polyphenol for reaction; and then adding a vinyl-containing halide for reaction followed by filtration, so as to obtain the phosphorus-containing flame retardant.

Optionally, the diphenol or polyphenol is preferably a diphenol, triphenol and tetraphenol, and more preferably diallyl bisphenol A (DABPA), bisphenol A, tri(hydroxyphenyl)ethane, tetra(hydroxyphenyl)ethane or any combination thereof.

Optionally, the dichloride compound is preferably bis(chloromethyl)benzene, bis(chloromethyl)biphenyl, bis(chloromethyl)ether or a combination thereof.

The metal salt of DOPO-containing diphenol or polyphenol may be prepared by dissolving a DOPO-containing diphenol or polyphenol and an alkaline metal salt of alcohol in a solvent, followed by reflowing, steaming and drying steps.

Optionally, the alkaline metal salt of alcohol is preferably a potassium salt of alcohol; for example, the alkaline metal salt of alcohol may be, but not limited to, potassium ethoxide, potassium tert-butoxide or any combination thereof.

Optionally, the solvent for dissolving the DOPO-containing diphenol or polyphenol and the alkaline metal salt of alcohol is tetrahydrofuran (THF), but not limited thereto.

Optionally, during the preparation of the metal salt of DOPO-containing diphenol or polyphenol, the reflowing temperature is controlled at 40 to 120° C., such as 60 to 120° C., and the reaction time is 2 to 8 hours.

Optionally, the metal salt of DOPO-containing diphenol or polyphenol is preferably a potassium salt of DOPO-containing diphenol or polyphenol, such as but not limited to a potassium salt of 2-(10H-9-oxa-10-phospha-1-phenanthryl)hydroquinone phosphorus oxide (DOPO-HQ, also known as 10-(2,5-dihydroxyphenyl)-10H-9-oxa-10-phosphaphenanthrene-10-oxide).

Optionally, the vinyl-containing halide is preferably a vinyl-containing chloride. For example, the vinyl-containing halide may be, but not limited to, vinylbenzyl chloride, vinyl chloride, allyl chloride, acryloyl chloride, methacryloyl chloride or a combination thereof.

Optionally, a proper amount of solvent is added during the reaction of a diphenol or polyphenol and a dichloride compound, examples including but not limited to ketones (e.g., acetone or methyl ethyl ketone), toluene or a combination thereof.

Optionally, during the reaction of a diphenol or polyphenol with a dichloride compound, a phase transfer catalyst is added, such as but not limited to tetrabutylammonium bromide.

Optionally, during the reaction of a diphenol or polyphenol with a dichloride compound, an alkaline solution is added, examples including but not limited to sodium hydroxide solution, potassium hydroxide solution, triethylamine and potassium tert-butoxide.

In one embodiment, the method comprises reacting a diphenol or polyphenol with a dichloride compound to obtain a first intermediate; then adding a metal salt of a 9,10-dihydro-9-oxa-10-phosphaphenanthrene-10-oxide (DOPO)-containing diphenol or a DOPO-containing polyphenol for reaction to obtain a second intermediate; and then adding a vinyl-containing halide for reaction so as to obtain the phosphorus-containing flame retardant.

Optionally, the molar ratio of the diphenol or polyphenol to the dichloride compound is 8:1 to 1:25. Examples include, but not limited to, 8:1, 7:1, 6:1, 5:1, 4:1, 3:1, 2:1, 1:1, 1:2, 1:3, 1:4, 1:5, 1:10, 1:15, 1:20, and 1:25.

Optionally, the molar ratio of the first intermediate to the metal salt of DOPO-containing diphenol or polyphenol is 8:1 to 1:25. Examples include, but not limited to, 8:1, 7:1, 6:1, 5:1, 4:1, 3:1, 2:1, 1:1, 1:2, 1:3, 1:4, 1:5, 1:10, 1:15, 1:20, and 1:25.

Optionally, the molar ratio of the second intermediate to the vinyl-containing halide is 8:1 to 1:25. Examples include, but not limited to, 8:1, 7:1, 6:1, 5:1, 4:1, 3:1, 2:1, 1:1, 1:2, 1:3, 1:4, 1:5, 1:10, 1:15, 1:20, and 1:25.

Optionally, during the reaction of the diphenol or polyphenol and the dichloride compound, the temperature is controlled at 40 to 120° C., such as 60 to 120° C., and the reaction time is 1 to 8 hours.

Optionally, during the reaction of the first intermediate and the metal salt of DOPO-containing diphenol or polyphenol, the temperature is controlled at 40 to 120° C., such as 60 to 120° C., and the reaction time is 1 to 6 hours.

Optionally, during the reaction of the second intermediate and the vinyl-containing halide, the temperature is controlled at 40 to 120° C., such as 60 to 120° C., and the reaction time is 1 to 6 hours.

Optionally, the reaction product of the second intermediate and the vinyl-containing halide is subject to washing and purification processes.

More particularly, diallyl bisphenol A, 1,4-bis(chloromethyl)benzene and toluene are added to a reaction tank, which is then added with an alkaline sodium hydroxide solution, stirred and mixed, added with a phase transfer catalyst tetrabutylammonium bromide, and then heated to 80° C. and kept stirred for another 4 hours to obtain the first intermediate, followed by the addition of DOPO-HQ potassium salt and kept at 80° C. and stirred for another 2 hours to obtain the second intermediate, followed by the addition of vinylbenzyl chloride and kept at 80° C. and stirred for another 2 hours, followed by water washing and purification, so as to obtain a flame retardant represented by Formula (32).

In another embodiment of the present disclosure, the method comprises: reacting a first diphenol or polyphenol with a dichloride compound to obtain a first intermediate; then adding a second diphenol or polyphenol for reaction to obtain a second intermediate; then adding a metal salt of a DOPO-containing diphenol or a DOPO-containing polyphenol for reaction to obtain a third intermediate; and then adding a vinyl-containing halide for reaction so as to obtain the phosphorus-containing flame retardant.

Optionally, the molar ratio of the first diphenol or polyphenol to the dichloride compound is 8:1 to 1:25. Examples include, but not limited to, 8:1, 7:1, 6:1, 5:1, 4:1, 3:1, 2:1, 1:1, 1:2, 1:3, 1:4, 1:5, 1:10, 1:15, 1:20, and 1:25.

Optionally, the molar ratio of the first intermediate to the second diphenol or polyphenol is 8:1 to 1:25. Examples include, but not limited to, 8:1, 7:1, 6:1, 5:1, 4:1, 3:1, 2:1, 1:1, 1:2, 1:3, 1:4, 1:5, 1:10, 1:15, 1:20, and 1:25.

Optionally, the molar ratio of the second intermediate to the metal salt of DOPO-containing diphenol or polyphenol is 8:1 to 1:25. Examples include, but not limited to, 8:1, 7:1, 6:1, 5:1, 4:1, 3:1, 2:1, 1:1, 1:2, 1:3, 1:4, 1:5, 1:10, 1:15, 1:20, and 1:25.

Optionally, the molar ratio of the third intermediate to the vinyl-containing halide is 8:1 to 1:25. Examples include, but not limited to, 8:1, 7:1, 6:1, 5:1, 4:1, 3:1, 2:1, 1:1, 1:2, 1:3, 1:4, 1:5, 1:10, 1:15, 1:20, and 1:25.

Optionally, during the reaction of the first diphenol or polyphenol and the dichloride compound, the temperature is controlled at 40 to 120° C., such as 60 to 120° C., and the reaction time is 1 to 8 hours.

Optionally, during the reaction of the first intermediate and the second diphenol or polyphenol, the temperature is controlled at 40 to 120° C., such as 60 to 120° C., and the reaction time is 1 to 6 hours.

Optionally, during the reaction of the second intermediate and the metal salt of DOPO-containing diphenol or polyphenol, the temperature is controlled at 40 to 120° C., such as 60 to 120° C., and the reaction time is 1 to 6 hours.

Optionally, during the reaction of the third intermediate and the vinyl-containing halide, the temperature is controlled at 40 to 120° C., such as 60 to 120° C., and the reaction time is 1 to 6 hours.

Optionally, the reaction product of the third intermediate and the vinyl-containing halide is subject to washing and purification processes.

Other preparation processes not specified in detail are the same as the methods described above.

Resin Composition

The present disclosure further provides a resin composition comprising the aforesaid phosphorus-containing flame retardant and an unsaturated bond-containing resin.

Examples of the unsaturated bond-containing resin are not particularly limited and may comprise various unsaturated bond-containing resins known in the art, including but not limited to divinylbenzene (DVB), bis(vinylbenzyl) ether (BVBE), 1,2-bis(vinylphenyl) ethane (BVPE), triallyl isocyanurate (TRIC), prepolymer of triallyl isocyanurate (prepolymer TAIC), triallyl cyanurate (TAC), prepolymer of triallyl cyanurate (pre-polymer TAC), 1,2,4-trivinyl cyclohexane (TVCH), vinyl benzyl maleimide (VBM), diallyl bisphenol A (DABPA), styrene, acrylate (e.g., tricyclodecane dimethacrylate or trimethacrylate), vinyl-containing polyphenylene oxide resin, maleimide resin, polyolefin, or a combination thereof.

Unless otherwise specified, the aforesaid unsaturated bond-containing resin may be present as a monomer, an oligomer, a polymer, a combination thereof or a prepolymer thereof. For example, the unsaturated bond-containing resin may comprise one or more monomers, oligomers, polymers, prepolymers or any combination thereof.

The vinyl-containing polyphenylene oxide resin disclosed herein may comprise, but not limited to, any one or more polyphenylene oxide resins useful for making a prepreg, a resin film, a laminate or a printed circuit board, examples including such as vinylbenzyl polyphenylene oxide resin (e.g., OPE-2st, available from Mitsubishi Gas Chemical Co., Inc.), methacrylate polyphenylene oxide resin (e.g., SA-9000, available from SABIC), vinylbenzyl-modified bisphenol A polyphenylene oxide or chain-extended polyphenylene oxide. For example, the chain-extended polyphenylene oxide may include various polyphenylene oxide resins disclosed in the US Patent Application Publication No. 2016/0185904 A1, all of which are incorporated herein by reference in their entirety.

For example, in various embodiments of the present disclosure, the resin composition may comprise 1 to 100 parts by weight of the vinyl-containing polyphenylene oxide resin, such as 50 to 100 parts by weight of the vinyl-containing polyphenylene oxide resin, or such as 20 to 80 parts by weight of the vinyl-containing polyphenylene oxide resin, or such as 30 to 50 parts by weight of the vinyl-containing polyphenylene oxide resin.

The maleimide resin of the present disclosure is not particularly limited and may refer to a compound, monomer, mixture, oligomer or polymer containing at least one maleimide group. Unless otherwise specified, the maleimide resin used in the present disclosure is not particularly limited and may include any one or more maleimide resins useful for preparing a prepreg, a resin film, a resin-coated copper, a laminate or a printed circuit board. Examples include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl hexane), N-2,3-xylylmaleimide, N-2,6-xylenemaleimide, N-phenylmaleimide, maleimide compounds containing aliphatic long chain structures, prepolymer thereof and a combination thereof. The aforesaid prepolymer may for example be a prepolymer of diallyl compound and maleimide compound, a prepolymer of diamine and maleimide compound, a prepolymer of multi-functional amine and maleimide compound or a prepolymer of acid phenol compound and maleimide compound.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

For example, in various embodiments of the present disclosure, the resin composition may comprise 1 to 100 parts by weight of the maleimide resin, such as 50 to 100 parts by weight of the maleimide resin, or such as 5 to 50 parts by weight of the maleimide resin.

For example, the polyolefin used in the present disclosure is not particularly limited and may be any one or more commercial products or a combination thereof. Examples of polyolefin include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, polybutadiene, poly(methylstyrene), petroleum resin, cycloolefin copolymer and a combination thereof.

For example, in various embodiments, the resin composition may comprise 1 to 100 parts by weight of the polyolefin, such as 5 to 50 parts by weight of the polyolefin.

Unless otherwise specified, the amount and ratio of the phosphorus-containing flame retardant and the unsaturated bond-containing resin may be adjusted according to needs.

In one embodiment, the resin composition may comprise 5 parts by weight to 40 parts by weight of the phosphorus-containing flame retardant and 50 parts by weight to 100 parts by weight of the unsaturated bond-containing resin.

In a preferred embodiment, the resin composition may comprise 10 parts by weight to 30 parts by weight of the phosphorus-containing flame retardant and 50 parts by weight to 100 parts by weight of the unsaturated bond-containing resin.

In addition to the aforesaid two components, the resin composition may optionally further comprise epoxy resin, cyanate ester resin, phenolic resin, benzoxazine resin, styrene maleic anhydride resin, polyester, amine curing agent, polyamide, polyimide or a combination thereof.

Unless otherwise specified, relative to a total of 1 to 100 parts by weight of the phosphorus-containing flame retardant and the unsaturated bond-containing resin, any additional components described above may be used at an amount of 1 to 100 parts by weight.

For example, the epoxy resin may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one, two or more selected from DOPO-containing phenolic novolac epoxy resin, DOPO-containing cresol novolac epoxy resin and DOPO-containing bisphenol-A novolac epoxy resin; the DOPO-HQ epoxy resin may be any one, two or more selected from DOPO-HQ-containing phenolic novolac epoxy resin, DOPO-HQ-containing cresol novolac epoxy resin and DOPO-HQ-containing bisphenol-A novolac epoxy resin.

For example, the cyanate ester resin is not particularly limited and may be any compound with an Ar—O—C≡N structure, wherein Ar represents a substituted or unsubstituted aromatic group, novolac, bisphenol A, bisphenol A novolac, bisphenol F, bisphenol F novolac or phenolphthalein. For example, the cyanate ester resin may be available under the tradename Primaset PT-15, PT-30S, PT-60S, CT-90, BADCY, BA-100-10T, BA-200, BA-230S, BA-3000S, BTP-2500, BTP-6020S, DT-4000, DT-7000, Methylcy, ME-240S, ULL950S, HTL-300, CE-320, LVT-50, LeCy, etc. available from Lonza.

For example, the phenolic resin may comprise but not limited to mono-functional, bifunctional or multifunctional phenolic resin, comprising phenolic resin of a resin composition conventionally useful for making prepregs, such as phenoxy resin, phenol novolac resin, etc.

For example, the benzoxazine resin includes, but not limited to, bisphenol A benzoxazine resin, bisphenol F benzoxazine resin, phenolphthalein benzoxazine resin, dicyclopentadiene benzoxazine resin, phosphorus-containing benzoxazine resin, oxydianiline benzoxazine resin, or unsaturated bond containing benzoxazine resin, such as but not limited to LZ-8270, LZ-8280 or LZ-8290 available from Huntsman or HFB-2006M available from Showa High Polymer.

For example, in the aforesaid styrene maleic anhydride resin, the ratio of styrene (S) and maleic anhydride (MA) may be for example 1/1, 2/1, 3/1, 4/1, 6/1, 8/1 or 12/1, including styrene maleic anhydride copolymers such as SMA-1000, SMA-2000, SMA-3000, EF-30, EF-40, EF-60 and EF-80 available from Cray Valley.

For example, the polyester may be any polyester resin known in the field to which this disclosure pertains, including but not limited to various commercially available polyester resin products. Examples include, but not limited to, HPC-8000T65, available from D.I.C. Corporation.

For example, the amine curing agent may include, but not limited to, any one or a combination of diamino diphenyl sulfone, diamino diphenyl methane, diamino diphenyl ether, diamino diphenyl sulfide and dicyandiamide (DICY).

For example, the polyamide may be any polyamide resin known in the field to which this disclosure pertains, including but not limited to various commercially available polyamide resin products.

For example, the polyimide may be any polyimide resin known in the field to which this disclosure pertains, including but not limited to various commercially available polyimide resin products.

In addition to the aforesaid components, the resin composition may optionally further comprise flame retardant, inorganic filler, curing accelerator, solvent, silane coupling agent, surfactant, coloring agent, toughening agent or a combination thereof. Unless otherwise specified, relative to a total of 1 to 100 parts by weight of the phosphorus-containing flame retardant and the unsaturated bond-containing resin, any additional components described above may be used at an amount of 1 to 100 parts by weight.

For example, relative to a total of 100 parts by weight of the phosphorus-containing flame retardant and the unsaturated bond-containing resin, the amount of flame retardant used in the present disclosure is not particularly limited, and may range from 1 to 100 parts by weight.

The flame retardant used herein may be any one or more flame retardants useful for preparing a prepreg, a resin film, a resin-coated copper, a laminate or a printed circuit board; examples of flame retardant include but are not limited to phosphorus-containing flame retardant, preferably any one, two or more selected from the following group: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives (such as di-DOPO compounds) or resins, DPPO (diphenylphosphine oxide) and its derivatives (such as di-DPPO compounds) or resins, melamine cyanurate, tri-hydroxy ethyl isocyanurate and aluminium phosphinate (e.g., commercially available OP-930 and OP-935).

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

Unless otherwise specified, relative to a total of 100 parts by weight of the phosphorus-containing flame retardant and the unsaturated bond-containing resin, the amount of inorganic filler used in the present disclosure is not particularly limited, and may range from 10 to 300 parts by weight.

The inorganic filler may be any one or more inorganic fillers useful for preparing a prepreg, a resin film, a resin-coated copper, a laminate or a printed circuit board; examples of inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (A100H), calcined talc, talc, silicon nitride and calcined kaolin. Moreover, the inorganic filler can be spherical, fibrous, plate-like, particulate, sheet-like or whisker-like and can be optionally pretreated by a silane coupling agent.

For example, the curing accelerator (e.g., curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4M1), triphenyiphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. Preferably, the curing accelerator (e.g., curing initiator) may comprise a peroxide capable of producing free radicals, including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof.

The purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

Silane coupling agent may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane.

The purpose of surfactant is to ensure uniform distribution of the inorganic filler in the resin composition.

For example, the coloring agent (i.e., staining agent) may comprise, but not limited to, dye or pigment.

The purpose of adding toughening agent is to improve the toughness of the resin composition. The toughening agent may comprise, but not limited to, rubber resin, carboxyl-terminated butadiene acrylonitrile rubber (CTBN rubber), core-shell rubber, or a combination thereof Articles Made from Resin Compositions The resin compositions of various embodiments may be processed by various methods into different articles, including but not limited to a prepreg, a resin film, a resin-coated copper, a laminate or a printed circuit board.

For example, the resin compositions of various embodiments may be used to make prepregs.

For example, by well mixing the resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

In one embodiment, the prepreg has a reinforcement material and a layered structure formed thereon, wherein the layered structure is made by heating the resin composition to a semi-cured state (B-stage). Suitable baking temperature for making the prepreg may be for example 120° C. to 180° C. For example, the reinforcement material may be any one of a fiber material, woven fabric, non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pretreated by a silane coupling agent. The prepreg may be further heated and cured to the C-stage to form an insulation layer.

The article made from the resin composition may also be a resin film, which is made by heating and baking the resin composition to a semi-cured state, such as by selectively coating the resin composition on a polyethylene terephthalate film (PET film) or a polyimide film, followed by heating and baking to a semi-cured state to obtain the resin film.

The article made from the resin composition may be a resin-coated copper, wherein the resin composition from each embodiment is coated on a copper foil to uniformly adhere the resin composition thereon, followed by heating and baking to a semi-cured state to obtain the resin-coated copper.

In one embodiment, the resin composition of the present disclosure may be made into a laminate, such as a copper-clad laminate, which comprises two copper foils and an insulation layer disposed between the copper foils, wherein the insulation layer is made by curing the resin composition at high temperature and high pressure (C-stage), a suitable curing temperature being for example between 190° C. and 220° C. and preferably between 200° C. and 210° C. and a suitable curing time being 90 to 180 minutes and preferably 120 to 150 minutes. The insulation layer may be obtained by curing the aforesaid prepreg or resin film. The metal foil may be copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board.

For example, a double-sided copper-clad laminate (such as product name EM-827, available from Elite Material Co., Ltd.) with a thickness of 28 mil and having a 1 ounce (oz) HTE (high temperature elongation) copper foil may be provided and subject to drilling and then electroplating, so as to form electrical conduction between the upper layer copper foil and the bottom layer copper foil. Then etch the upper layer copper foil and the bottom layer copper foil to form inner layer circuits. Then perform brown oxidation and roughening on the inner layer circuits to form uneven structure on the surface to increase roughness. Next, a vacuum lamination apparatus is used to laminate the assembly of a copper foil, the prepreg, the inner layer circuits, the prepreg and a copper foil stacked in said order by heating at 190 to 220° C. for 90 to 180 minutes to cure the insulation material of the prepregs. Next, black oxidation, drilling, copper plating and other known circuit board processes are performed on the outmost copper foil so as to obtain the printed circuit board.

For example, the resin composition of the present disclosure and various articles made therefrom may have any one or a combination of the following properties:

a glass transition temperature as measured using a dynamic mechanical analyzer (DMA) by reference to IPC-TM-650 2.4.24.4 of greater than or equal to 210° C., such as between 210° C. and 230° C. or between 210° C. and 220° C.;

a ratio of dimensional change in Z-axis as measured using a thermomechanical analyzer (TMA) by reference to IPC-TM-650 2.4.24.5 of less than or equal to 2.5%, such as between 2.2% and 2.5%;

a thermal resistance after moisture absorption as measured by reference to IPC-TM-650 2.6.16.1 and IPC-TM-650 2.4.23 of greater than or equal to 5 hours without delamination, wherein delamination represents at least partial separation between insulation layers of the laminate;

a flame retardancy of V-0 rating as measured by reference to UL94;

a peel strength as measured by reference to IPC-TM-650 2.4.8 of greater than or equal to 4.0 lb/inch, such as between 4.1 lb/inch and 4.6 lb/inch;

a dielectric constant at 10 GHz as measured by reference to JIS C2565 of less than or equal to 3.9, such as between 3.7 and 3.9, or between 3.7 and 3.8;

a dissipation factor at 10 GHz as measured by reference to JIS C2565 of less than or equal to 0.0055, such as between 0.0048 and 0.0053.

In one embodiment, the prepreg has a resin filling property of greater than or equal to 80%.

In one embodiment, the laminate has an alkali resistance time of greater than or equal to 15 minutes, such as between 15 minutes and 20 minutes.

EXAMPLES

Raw materials below were used to prepare the resin compositions of various Examples and Comparative Examples of the present disclosure according to the amount listed in Tables 1-2 and Tables 5-6 and further fabricated to prepare test samples or articles.

The names of chemicals used in the examples and comparative examples are as follows:
1. Diallyl bisphenol A: DABPA, available from Laizhou City Laiyu Chemical Co., Ltd.
2. Bisphenol A: B802575, available from Shanghai Macklin Biochemical Co., Ltd.
3. Tri(hydroxyphenyl)ethane: HWG18665, available from Beijing HWRK Chem. Co., Ltd.
4. Tetra(hydroxyphenyl)ethane: TPN1, available from Nan Ya Plastics Corporation.
5. 2-(10H-9-oxa-10-phospha-1-phenanthryl)hydroquinone phosphorus oxide (DOPO-HQ): CG-DOPO-HQ, available from Nanjing Chembridge Tech-Material Co., Ltd.
6. Vinylbenzyl chloride (VBC): C1792, available from TCI (Shanghai) Development Co., Ltd.
7. 1,4-Bis(chloromethyl)benzene (a.k.a. A,A'-dichloro-1,4-xylene): D104515, available from Shanghai Aladdin Bio-Chem Technology Co., Ltd.
8. Triallyl isocyanurate: TAIC, available from Kingyorker Enterprise Co., Ltd.
9. Bismaleimide: BMI-70, available from K.I Chemical Industry Co., Ltd.
10. Bis(vinylbenzyl)-terminated polyphenylene oxide resin: OPE-2st, available from Mitsubishi Gas Chemical Co., Inc.
11. Vinyl-terminated phosphorus-containing polyphenylene oxide resin: P-PPO, synthesized by reference to the process described in US Patent Application Publication No. 2017/0088669 A1, Formula (V).
12. DOPO derivative: di-DOPO compound, synthesized by reference to the process described in US Patent Application Publication No. 2017/0166729 A1, Formula (Ia).
13. Phosphorus-containing phenol novolac resin: XZ92741, available from Blue Cube Chemicals (Zhangjiagang) Co., Ltd.
14. Styrene-butadiene-divinylbenzene terpolymer: Ricon 257, available from Cray Valley.
15. Butadiene-styrene copolymer: Ricon 184, available from Cray Valley.
16. Spherical silica: SFP-30MK, available from DENKA Company Limited.
17. 2,5-dimethyl-2,5-di(tert-butylperoxy)-3-hexyne: 25B, available from NOF Corporation.

Components A1 to A5 used in Examples E1 to E13 respectively correspond to the products obtained from Preparation Examples 1 to 5. Components A6 to A8 used in Comparative Examples C1 to C13 respectively correspond to the products obtained from Preparation Examples 6 to 8.

Preparation Example 1

0.2 mole (35 g) of 1,4-bis(chloromethyl)benzene, 0.1 mole (30.8 g) of diallyl bisphenol A (DABPA) and 120 g of toluene as solvent were added to a stirred tank, followed by the addition of 40.0 g of 20% NaOH aqueous solution and then 16.1 g of tetrabutylammonium bromide; then the temperature was increased to 80° C. and the solution was kept stirring for 4 hours to obtain a first intermediate; then 0.2 mole (79.2 g) of DOPO-HQ potassium salt (which was obtained by dissolving 0.1 mole (79.2 g) of DOPO-HQ and 0.1 mole (22.4 g) of potassium tert-butoxide in tetrahydrofuran (THF) as solvent, controlling the temperature at 80° C., reflowing for 6 hours, and steaming and drying) was added, and the temperature was kept at 80° C. and reaction stirred for another 2 hours to obtained a second intermediate; and then 0.2 mole (30.6 g) of vinylbenzyl chloride (VBC) was added, and the temperature was kept at 80° C. and reaction stirred for another 2 hours, followed by washing and purification processes to obtain Product A1.

Fourier transform infrared spectroscopy (FTIR) analysis of Product A1 prepared in Preparation Example 1, as shown in the FIGURE, reveals the presence of P—Ar vibration peak and P=O absorption peak of DOPO-HQ at 1462.37 $cm^{-1}$ and 1295.40 $cm^{-1}$ respectively, the presence of C—H stretch vibration peak on $CH_3$ of DABPA at 2967.50 $cm^{-1}$, the presence of double bond characteristic peaks of the vinylbenzyl chloride (VBC) at 995.29 $cm^{-1}$ and 911.56 $cm^{-1}$, and the absence of characteristic peak of phenolic hydroxyl group at 3435.29 $cm^{-1}$ of the diallyl bisphenol A (DABPA) reactant, indicating that the product thus obtained is a phosphorus-containing flame retardant of the present disclosure.

Preparation Example 2

0.3 mole (52.5 g) of 1,4-bis(chloromethyl)benzene, 0.1 mole (30.6 g) of tri(hydroxyphenyl)ethane and 120 g of toluene as solvent were added to a stirred tank, followed by the addition of 60.0 g of 20% NaOH aqueous solution and then 16.1 g of tetrabutylammonium bromide; then the temperature was increased to 80° C. and the solution was kept stirring for 4 hours to obtain a first intermediate; then 0.3 mole (118.8 g) of DOPO-HQ potassium salt was added, and the temperature was kept at 80° C. and reaction stirred for another 2 hours to obtained a second intermediate; and then 0.3 mole (45.9 g) of vinylbenzyl chloride (VBC) was added, and the temperature was kept at 80° C. and reaction stirred for another 2 hours, followed by washing and purification processes to obtain Product A2.

Preparation Example 3

0.4 mole (70.0 g) of 1,4-bis(chloromethyl)benzene, 0.1 mole (38.2 g) of tetra(hydroxyphenyl)ethane and 120 g of toluene as solvent were added to a stirred tank, followed by the addition of 80.0 g of 20% NaOH aqueous solution and then 16.1 g of tetrabutylammonium bromide; then the temperature was increased to 80° C. and the solution was kept stirring for 4 hours to obtain a first intermediate; then 0.4 mole (164.0 g) of DOPO-HQ potassium salt was added, and the temperature was kept at 80° C. and reaction stirred for another 2 hours to obtained a second intermediate; and then 0.4 mole (61.2 g) of vinylbenzyl chloride (VBC) was added, and the temperature was kept at 80° C. and reaction stirred for another 2 hours, followed by washing and purification processes to obtain Product A3.

Preparation Example 4

0.8 mole (140.0 g) of 1,4-bis(chloromethyl)benzene, 0.1 mole (38.2 g) of tetra(hydroxyphenyl)ethane and 240 g of toluene as solvent were added to a stirred tank, followed by the addition of 160.0 g of 20% NaOH aqueous solution and then 16.1 g of tetrabutylammonium bromide; then the temperature was increased to 80° C. and the solution was kept stirring for 4 hours to obtain a first intermediate; then 0.4 mole (123.2 g) of diallyl bisphenol A (DABPA) was added, and the temperature was kept at 80° C. and reaction stirred for another 2 hours to obtained a second intermediate; then 0.4 mole (164.0 g) of DOPO-HQ potassium salt was added, and the temperature was kept at 80° C. and reaction stirred for another 2 hours to obtained a third intermediate; and then 0.4 mole (61.2 g) of vinylbenzyl chloride (VBC) was added, and the temperature was kept at 80° C. and reaction stirred for another 2 hours, followed by washing and purification processes to obtain Product A4.

Preparation Example 5

0.2 mole (35 g) of 1,4-bis(chloromethyl)benzene, 0.1 mole (22.8 g) of bisphenol A (BPA) and 120 g of toluene as solvent were added to a stirred tank, followed by the addition of 40.0 g of 20% NaOH aqueous solution and then 16.1 g of tetrabutylammonium bromide; then the temperature was increased to 80° C. and the solution was kept stirring for 4 hours to obtain a first intermediate; then 0.2 mole (79.2 g) of DOPO-HQ potassium salt was added, and the temperature was kept at 80° C. and reaction stirred for another 2 hours to obtained a second intermediate; and then 0.2 mole (30.6 g) of vinylbenzyl chloride (VBC) was added, and the temperature was kept at 80° C. and reaction stirred for another 2 hours, followed by washing and purification processes to obtain Product A5.

Preparation Example 6

0.1 mole (17.5 g) of 1,4-bis(chloromethyl)benzene, 0.2 mole (79.2 g) of DOPO-HQ potassium salt and 120 g of toluene as solvent were added to a stirred tank, followed by the addition of 40.0 g of 20% NaOH aqueous solution and then 16.1 g of tetrabutylammonium bromide; then the temperature was increased to 80° C. and the solution was kept stirring for 4 hours; and then 0.2 mole (30.6 g) of vinylbenzyl chloride (VBC) was added, and the temperature was kept at 80° C. and reaction stirred for another 2 hours, followed by washing and purification processes to obtain Product A6.

Preparation Example 7

0.1 mole (17.5 g) of 1,4-bis(chloromethyl)benzene, 0.2 mole (61.6 g) of diallyl bisphenol A (DABPA) and 120 g of toluene as solvent were added to a stirred tank, followed by the addition of 40.0 g of 20% NaOH aqueous solution and then 16.1 g of tetrabutylammonium bromide; then the temperature was increased to 80° C. and the solution was kept stirring for 4 hours; and then 0.2 mole (30.6 g) of vinylbenzyl chloride (VBC) as well as 60.0 g of 20% NaOH aqueous solution were added, and the temperature was kept at 80° C. and reaction stirred for another 2 hours, followed by washing and purification processes to obtain Product A7.

Preparation Example 8

0.3 mole (52.5 g) of 1,4-bis(chloromethyl)benzene, 0.1 mole (30.6 g) of tri(hydroxyphenyl)ethane and 120 g of toluene as solvent were added to a stirred tank, followed by the addition of 60.0 g of 20% NaOH aqueous solution and then 16.1 g of tetrabutylammonium bromide; then the temperature was increased to 80° C. and the solution was kept stirring for 4 hours; and then 0.3 mole (45.9 g) of vinylbenzyl chloride (VBC) as well as 60.0 g of 20% NaOH aqueous solution were added, and the temperature was kept at 80° C. and reaction stirred for another 2 hours, followed by washing and purification processes to obtain Product A8.

For the property tests of Examples E1 to E13 and Comparative Examples C1 to C13 listed in Tables 3, 4, 7 and 8, samples (specimens) were prepared as described below and tested under specified conditions as follows.

1. Prepreg: Resin composition from each Example (Table 1 and Table 2) and each Comparative Example (Table 5 and Table 6) was separately well-mixed to form a varnish, which was then loaded to an impregnation tank; a fiberglass fabric (e.g., 2116 E-glass fiber fabric, available from Asahi) was impregnated into the impregnation tank to adhere the resin composition onto the fiberglass fabric, followed by heating and baking at 145° C. for about 4 minutes to obtain a prepreg.

2. Copper-clad laminate (5-ply, formed by lamination of five prepregs): Two 18 nm RTF copper foils (reverse treated copper foils) and five prepregs obtained from 2116 fiberglass fabrics impregnated with each Example or Comparative Example and having a resin content of about 55% were prepared and stacked in the order of one copper foil, five prepregs and one RTF copper foil, followed by lamination under vacuum at 30 kgf/cm$^2$ pressure and 200° C. for 2 hours to form a copper-clad laminate. Insulation layers between the two copper foils were framed by laminating five sheets of prepreg, and the resin content of the insulation layers is about 55%.

3. Copper-free laminate (5-ply, formed by lamination of five prepregs): Each aforesaid copper-clad laminate was etched to remove the two copper foils to obtain a copper-free laminate (5-ply), which was formed by laminating five sheets of prepreg and has a resin content of about 55%.

4. Copper-free laminate (2-ply, formed by lamination of two prepregs): Two 18 μm RTF copper foils (reverse treated copper foils) and two prepregs obtained from 2116 fiberglass fabrics impregnated with each Example or Comparative Example and having a resin content of about 55% were prepared and stacked in the order of one RTF copper foil, two prepregs and one RTF copper foil, followed by lamination under vacuum at 30 kgf/cm$^2$ pressure and 200° C. for 2 hours to form a copper-clad laminate. Insulation layers between the two copper foils were formed by laminating two sheets of prepreg, and the resin content of the insulation layers is about 55%. Each copper-clad laminate was etched to remove the two copper foils to obtain a copper-free laminate (2-ply) obtained by laminating two prepregs and having a resin content of about 55%.

Each specimen was analyzed as described below.

1. Resin Filling Property of Prepreg

Eleven prepregs obtained from 2116 E-glass fiber fabrics impregnated with each Example or Comparative Example were prepared and covered on both sides with a one-ounce HTE (high temperature elongation) copper foil and laminated to form a copper-clad laminate, which was drilled to form a core with through holes. A piece of prepreg obtained from 2116 E-glass fiber fabric and a piece of one-ounce HTE copper foil were stacked below it, and a release film is stacked on it, followed by another lamination to form a second copper-clad laminate. The release film on the copper-clad laminate was removed to observe whether the through holes were filled, and the filling percentage was recorded.

2. Flame Retardancy

In the flame retardancy test, a 125 mm×13 mm copper-free laminate specimen (obtained by laminating five prepregs) was measured in accordance with the UL94 rating to evaluate flame retardancy level represented by V-0, V-1, or V-2, wherein V-0 indicates a superior flame retardancy to V-1, V-1 indicates a superior flame retardancy to V-2, and burn-out is the worst.

3. Alkali Resistance

The aforesaid copper-free laminate formed by lamination of five prepregs was used as the specimen, which was cut into three pieces of test strip dimensioned 4 mm×2 mm, placed in a 105° C. oven and baked for 2 hours, and then soaked in a 90° C. 20% NaOH solution; with a 5-minute interval, the test strips were removed from the alkaline solution and visually inspected to determine the appearance of whitening or weave exposure, and the soaking time was recorded; the absence of whitening or weave exposure during the test means that the specimen has passed the alkali resistance test, while the appearance of whitening or weave exposure during the test means that the specimen has failed the alkali resistance test, in which situation another specimen was made and test was performed again, during which the specimen was visually inspected with a 1-minute interval to determine the appearance of whitening or weave exposure and the soaking time was recorded; longer soaking time without whitening and weave exposure represents better alkali resistance.

4. Glass Transition Temperature (Tg)

The copper-free laminate (obtained by laminating five prepregs) specimen was subject to glass transition temperature measurement. A dynamic mechanical analyzer (DMA) was used by reference to IPC-TM-650 2.4.24.4 "Glass Transition and Modulus of Materials Used in High Density Interconnection (HDI) and Microvias-DMA Method" to measure the glass transition temperature (° C.) of each specimen. Temperature interval during the measurement was set at 35-270° C. with an increase rate of 2° C./minute; higher glass transition temperature is more preferred.

5. Ratio of Dimensional Change (Z-Axis)

The copper-free laminate (obtained by laminating five prepregs) specimen was subject to thermal mechanical analysis (TMA) during ratio of dimensional change measurement. Each specimen was heated from 50° C. to 260° C. at an increase rate of 10° C./minute and then subject to the measurement of dimensional change (%) in Z-axis by reference to the method described in IPC-TM-650 2.4.24.5, wherein lower dimensional change (%) is more preferred and a value of greater than or equal to 0.1% represents significant difference.

6. Thermal Resistance after Moisture Absorption (Pressure Cooking Test)

The copper-free laminate specimen with copper foil etched and removed (obtained by laminating five prepregs) was subject to the pressure cooking test (PCT) by reference to IPC-TM-650 2.6.16.1 and 5 hours of moisture absorption, and then by reference to IPC-TM-650 2.4.23, the copper-free laminate specimen after moisture absorption was immersed into a 288° C. solder bath for 20 seconds, removed and inspected for the presence of delamination or blistering, which represents fail (X), such as whether interlayer delamination or blistering occurs between insulation layers. The absence of delamination and blistering, which represents pass (0), means no interlayer delamination and blistering occurs between insulation layers. Three samples were tested for each Example or Comparative Example.

7. Peeling Strength (P/S)

The copper-clad laminate (obtained by laminating five prepregs) specimen was tested by using a tensile strength tester by reference to IPC-TM-650 2.4.8 to measure the peeling strength (i.e., peeling strength between a copper foil and an outer insulation layer of a copper-clad laminate).

8. Dielectric Constant (Dk) and Dissipation Factor (Df)

In dielectric constant and dissipation factor measurements, the copper-free laminate (obtained by laminating two prepregs) was tested by using a microwave dielectrometer available from AET Corp. by reference to JIS C2565 "Measuring methods for ferrite cores for microwave device" at 10 GHz for analyzing each specimen. Lower dielectric constant and lower dissipation factor represent better dielectric properties of the specimen. A difference in Dk of greater than 0.1 represents a significant difference in dielectric constant of different laminates. Under a 10 GHz frequency, for a Df value of less than 0.005, a difference in Df of less than 0.0001 represents no substantial difference in dissipation factor in different laminates, and a difference in Df value of greater than 0.0001 represents a significant difference (i.e., significant technical difficulty) in dissipation factor in different laminates.

TABLE 1

Resin compositions of Examples E1 to E6 (in part by weight)

| | Component | | E1 | E2 | E3 | E4 | E5 | E6 |
|---|---|---|---|---|---|---|---|---|
| Preparation Example | Preparation Example 1 | A1 | 20 | 20 | 20 | 20 | 20 | 10 |
| | Preparation Example 2 | A2 | | | | | | |
| | Preparation Example 3 | A3 | | | | | | |
| | Preparation Example 4 | A4 | | | | | | |
| | Preparation Example 5 | A5 | | | | | | |
| polyphenylene oxide | vinylbenzyl-terminated polyphenylene oxide | OPE-2st | 60 | 50 | 70 | 60 | 60 | 60 |
| polyolefin | styrene-butadiene-divinylbenzene terpolymer | Ricon257 | 10 | 10 | 10 | 5 | 15 | 10 |
| | styrene-butadiene copolymer | Ricon184 | 10 | 10 | 10 | 5 | 15 | 10 |
| flame retardant | DOPO derivative | di-DOPO compound | 30 | 30 | 30 | 30 | 30 | 30 |
| filler | spherical $SiO_2$ | SFP-30MK | 45 | 45 | 45 | 45 | 45 | 45 |
| initiator | peroxide | 25B | 1 | 1 | 1 | 1 | 1 | 1 |
| solvent | toluene/MEK solvent mixture | | PA | PA | PA | PA | PA | PA |
| | | | | | | | | 20 |

PA represents "proper amount" in all Tables.

TABLE 2

Resin compositions of Examples E7-E13 (in part by weight)

| | Component | | E7 | E8 | E9 | E10 | E11 | E12 | E13 |
|---|---|---|---|---|---|---|---|---|---|
| Preparation Example | Preparation Example 1 | A1 | 30 | 40 | | | | | 10 |
| | Preparation Example 2 | A2 | | | 20 | | | | 5 |
| | Preparation Example 3 | A3 | | | | 20 | | | 5 |
| | Preparation Example 4 | A4 | | | | | 20 | | |
| | Preparation Example 5 | A5 | | | | | | 20 | |
| polyphenylene oxide | vinylbenzyl-terminated polyphenylene oxide | OPE-2st | 60 | 60 | 60 | 60 | 60 | 60 | 50 |
| polyolefin | styrene-butadiene-divinylbenzene terpolymer | Ricon257 | 10 | 10 | 10 | 10 | 10 | 10 | 10 |
| | styrene-butadiene copolymer | Ricon184 | 10 | 10 | 10 | 10 | 10 | 10 | 5 |
| flame retardant | DOPO derivative | di-DOPO compound | 30 | 30 | 30 | 30 | 30 | 30 | 30 |
| filler | spherical $SiO_2$ | SFP-30MK | 45 | 45 | 45 | 45 | 45 | 45 | 45 |
| initiator | peroxide | 25B | 1 | 1 | 1 | 1 | 1 | 1 | 1 |
| solvent | toluene/MEK solvent mixture | | PA | PA | PA | PA | PA | PA | PA |

TABLE 3

Test results of resin compositions of Examples E1-E6

| Item | Conditions | Unit | E1 | E2 | E3 | E4 | E5 | E6 |
|---|---|---|---|---|---|---|---|---|
| flame retardancy | UL94 | NA | V-0 | V-0 | V-0 | V-0 | V-0 | V-0 |
| resin filling property of prepreg | instrument observation | % | 100% | 100% | 100% | 100% | 100% | 100% |
| alkali resistance | 20% NaOH solution, 90° C. | minute | 20 | 20 | 20 | 20 | 20 | 20 |
| Tg | DMA, 35-270° C., 2° C./min | ° C. | 215 | 213 | 217 | 219 | 212 | 213 |
| ratio of dimensional change | TMA, 50-260° C., Z-axis | % | 2.4 | 2.4 | 2.4 | 2.4 | 2.5 | 2.4 |
| PCT | 2 atm/5 hrs, 3 pieces | NA | ○○○ | ○○○ | ○○○ | ○○○ | ○○○ | ○○○ |
| P/S | RTF copper foil, H oz | lb/inch | 4.3 | 4.4 | 4.2 | 4.4 | 4.1 | 4.2 |
| Dk | 2116 fabric, 55% R/C, 10 GHz | NA | 3.8 | 3.8 | 3.8 | 3.8 | 3.8 | 3.8 |
| Df | 2116 fabric, 55% R/C, 10 GHz | NA | 0.0049 | 0.0049 | 0.0048 | 0.0050 | 0.0047 | 0.0048 |

TABLE 4

Test results of resin compositions of Examples E7-E13

| Item | Conditions | Unit | E7 | E8 | E9 | E10 | E11 | E12 | E13 |
|---|---|---|---|---|---|---|---|---|---|
| flame retardancy | UL94 | NA | V-0 | V-0 | V-0 | V-0 | V-0 | V-0 | V-0 |
| resin filling property of prepreg | instrument observation | % | 100% | 90% | 90% | 90% | 100% | 80% | 100% |
| alkali resistance | 20% NaOH solution, 90° C. | minute | 20 | 15 | 20 | 20 | 20 | 20 | 20 |
| Tg | DMA, 35-270° C., 2° C./min | ° C. | 220 | 218 | 218 | 219 | 225 | 212 | 223 |
| ratio of dimensional change | TMA, 50-260° C., Z-axis | % | 2.4 | 2.4 | 2.4 | 2.2 | 2.2 | 2.4 | 2.2 |
| PCT | 2 atm/5 hrs, 3 pieces | NA | ○○○ | ○○○ | ○○○ | ○○○ | ○○○ | ○○○ | ○○○ |
| P/S | RTF copper foil, H oz | lb/inch | 4.5 | 4.5 | 4.5 | 4.6 | 4.5 | 4.4 | 4.5 |
| Dk | 2116 fabric, 55% R/C, 10 GHz | NA | 3.8 | 3.8 | 3.8 | 3.8 | 3.7 | 3.8 | 3.8 |
| Df | 2116 fabric, 55% R/C, 10 GHz | NA | 0.0050 | 0.0053 | 0.0049 | 0.0049 | 0.0047 | 0.0052 | 0.0048 |

TABLE 5

Resin compositions of Comparative Examples C1-C6 (in part by weight)

| | Component | | C1 | C2 | C3 | C4 | C5 | C6 |
|---|---|---|---|---|---|---|---|---|
| Preparation Example | Preparation Example 6 | A6 | 20 | | | 15.1 | | |
| | Preparation Example 7 | A7 | | 20 | 12.1 | | | |
| | Preparation Example 8 | A8 | | | | | | |
| | diallyl bisphenol A | DABPA | | | | 4.9 | 3.84 | |
| | 1,4-bis(chloromethyl) benzene | D104515 | | | | | 4.36 | |
| | vinylbenzyl chloride | C1792 | | | | | 3.82 | |
| polyphenylene oxide | vinylbenzyl-terminated polyphenylene oxide | OPE-2st | 60 | 60 | 60 | 60 | 60 | 60 |
| polyolefin | styrene-butadiene-divinylbenzene terpolymer | Ricon257 | 10 | 10 | 10 | 10 | 10 | 10 |
| | styrene-butadiene copolymer | Ricon184 | 10 | 10 | 10 | 10 | 10 | 10 |
| flame retardant | DOPO-HQ | CG-DOPO-HQ | | | 7.9 | | 7.98 | |
| | DOPO derivative | di-DOPO compound | 30 | 30 | 30 | 30 | 30 | 30 |
| filler | spherical SiO$_2$ | SFP-30MK | 45 | 45 | 45 | 45 | 45 | 45 |
| initiator | peroxide | 25B | 1 | 1 | 1 | 1 | 1 | 1 |
| solvent | toluene/MEK solvent mixture | | PA | PA | PA | PA | PA | PA |

TABLE 6

Resin compositions of Comparative Examples C7-C13 (in part by weight)

| | Component | | C7 | C8 | C9 | C10 | C11 | C12 | C13 |
|---|---|---|---|---|---|---|---|---|---|
| Preparation Example | Preparation Example 6 | A6 | | | | | | | |
| | Preparation Example 7 | A7 | | | | | | | 20 |
| | Preparation Example 8 | A8 | | | | | | | 20 |
| crosslinking agent | triallyl isocyanurate | TAIC | | | | 20 | | | |
| | bismaleimide | BMI-70 | | 20 | 20 | | 20 | | |
| PPO | vinyl-terminated phosphorus-containing polyphenylene oxide resin | P-PPO | | | | | | 20 | |
| | vinylbenzyl-terminated polyphenylene oxide | OPE-2st | 60 | 60 | 60 | 60 | 60 | 60 | 60 |
| polyolefin | styrene-butadiene-divinylbenzene terpolymer | Ricon257 | 10 | 10 | 10 | 10 | 10 | 10 | 10 |
| | styrene-butadiene copolymer | Ricon184 | 10 | 10 | 10 | 10 | 10 | 10 | 10 |
| flame retardant | DOPO-HQ | CG-DOPO-HQ | | | | | | | |
| | DOPO derivative | di-DOPO compound | 50 | 30 | 50 | 50 | 30 | 30 | 30 |
| | phosphorus-containing phenol novolac resin | XZ92741 | | | | | 20 | | |

TABLE 6-continued

Resin compositions of Comparative Examples C7-C13 (in part by weight)

| | Component | | C7 | C8 | C9 | C10 | C11 | C12 | C13 |
|---|---|---|---|---|---|---|---|---|---|
| filler | spherical SiO$_2$ | SFP-30MK | 45 | 45 | 45 | 45 | 45 | 45 | 45 |
| initiator | peroxide | 25B | 1 | 1 | 1 | 1 | 1 | 1 | 1 |
| solvent | toluene/MEK solvent mixture | | PA | PA | PA | PA | PA | PA | PA |

TABLE 7

Test results of resin compositions of Comparative Examples C1-C6

| Item | Conditions | Unit | C1 | C2 | C3 | C4 | C5 | C6 |
|---|---|---|---|---|---|---|---|---|
| flame retardancy | UL94 | NA | V-0 | V-1 | V-1 | V-0 | V-1 | V-1 |
| resin filling property of prepreg | instrument observation | % | 60% | 100% | 0% | 100% | 80% | 90% |
| alkali resistance | 20% NaOH solution, 90° C. | minute | 20 | 20 | 2 | 20 | 2 | 15 |
| Tg | DMA, 35-270° C., 2° C./min | ° C. | 207 | 217 | 205 | 201 | 186 | 204 |
| ratio of dimensional change | TMA, 50-260° C., Z-axis | % | 2.6 | 2.4 | 2.6 | 2.9 | 3.5 | 2.7 |
| PCT | 2 atm/5 hrs, 3 pieces | NA | ○○○ | ○○○ | XXX | ○○X | XXX | ○○○ |
| P/S | RTF copper foil, H oz | lb/inch | 3.8 | 3.7 | 3.5 | 3.9 | 2.5 | 3.3 |
| Dk | 2116 fabric, 55% R/C, 10 GHz | NA | 3.8 | 3.8 | 4.0 | 4.1 | 4.2 | 3.8 |
| Df | 2116 fabric, 55% R/C, 10 GHz | NA | 0.0051 | 0.0049 | 0.0068 | 0.0071 | 0.0081 | 0.0049 |

TABLE 8

Test results of resin compositions of Comparative Examples C7-C13

| Item | Conditions | Unit | C7 | C8 | C9 | C10 | C11 | C12 | C13 |
|---|---|---|---|---|---|---|---|---|---|
| flame retardancy | UL94 | NA | V-0 | V-1 | V-0 | V-0 | V-0 | V-1 | V-1 |
| resin filling property of prepreg | instrument observation | % | 60% | 50% | 30% | 80% | 60% | 60% | 50% |
| alkali resistance | 20% NaOH solution, 90° C. | minute | 5 | 15 | 5 | 5 | 10 | 20 | 20 |
| Tg | DMA, 35-270° C., 2° C./min | ° C. | 193 | 238 | 227 | 198 | 190 | 203 | 219 |
| ratio of dimensional change | TMA, 50-260° C., Z-axis | % | 3.4 | 2.2 | 2.4 | 3.3 | 3.4 | 2.8 | 2.3 |
| PCT | 2 atm/5 hrs, 3 pieces | NA | ○○X | ○XX | XXX | ○○X | XXX | ○○○ | ○○○ |
| P/S | RTF copper foil, H oz | lb/inch | 3.1 | 3.0 | 2.8 | 3.0 | 3.5 | 3.6 | 3.8 |
| Dk | 2116 fabric, 55% R/C, 10 GHz | NA | 3.8 | 3.9 | 3.9 | 3.8 | 4.1 | 3.8 | 3.8 |
| Df | 2116 fabric, 55% R/C, 10 GHz | NA | 0.0050 | 0.0060 | 0.0061 | 0.0052 | 0.0075 | 0.0050 | 0.0052 |

The following observations can be made from Table 1 to Table 8.

First, for resin compositions of Examples E1 and E9-E13 in which the phosphorus-containing flame retardant of the present disclosure is included, compared with Comparative Example C12 which contains vinyl-terminated phosphorus-containing polyphenylene oxide resin, higher resin filling property of prepreg, lower ratio of dimensional change, higher glass transition temperature, better flame retardancy and higher peeling strength can be observed. In contrast, Comparative Example C6, which includes a DOPO derivative, has poor flame retardancy, and Comparative Example C7, which contains higher amount of DOPO derivative, has deteriorated resin filling property of prepreg, alkali resistance, glass transition temperature, and ratio of dimensional change. Comparison of Examples E1 and E9-E13 with Comparative Example C7 indicates that Examples E1 and E9-E13 including the phosphorus-containing flame retardant of the present disclosure all have higher resin filling property of prepreg, better alkali resistance, higher glass transition temperature, higher peeling strength, and better thermal resistance after moisture absorption.

In contrast to Examples E1, E9, E10, and E12, the results of Example E11, which includes a phosphorus-containing flame retardant prepared from tetra(hydroxyphenyl)ethane and diallyl bisphenol A, and Example E13, which includes three different phosphorus-containing flame retardants of the present disclosure (i.e., a phosphorus-containing flame retardant prepared from diallyl bisphenol A, a phosphorus-containing flame retardant prepared from tri(hydroxyphenyl) ethane, and a phosphorus-containing flame retardant prepared from tetra(hydroxyphenyl)ethane), indicate that Examples E11 and E13 have higher glass transition temperature and lower dielectric constant and dissipation factor.

Side by side comparison of Example E1 with Comparative Example C5, in which components including 1,4-bis (chloromethyl)benzene, diallyl bisphenol A, DOPO-HQ, and vinylbenzyl chloride were individually added, Comparative Examples C1-C4 and C13, which include products prepared from three components thereof, Comparative Example C6 not including the phosphorus-containing flame retardant of the present disclosure, and Comparative Examples C7-C12, which include other flame retardants, it is found that Example E1 demonstrates better overall properties in terms of resin filling property of prepreg, flame retardancy, alkali resistance, glass transition temperature, thermal dimensional stability (ratio of dimensional change under heat), thermal resistance after moisture absorption, peeling strength, dielectric constant and dissipation factor; in particularly, the peeling strength was unexpectedly improved.

Generally, resin compositions including the phosphorus-containing flame retardant of the present disclosure may achieve unexpected improvement in at least one, more or all properties including resin filling property of prepreg, flame retardancy, alkali resistance, glass transition temperature, thermal dimensional stability (ratio of dimensional change under heat), thermal resistance after moisture absorption, peeling strength, dielectric constant and dissipation factor.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A phosphorus-containing compound represented by Formula (1):

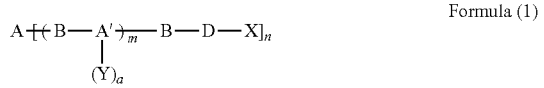

Formula (1)

wherein m is an integer of 0-50, n is an integer of 2-25, and a is an integer of 0-23;

A and A' individually represent a group derived from dehydrogenation of hydroxyl group of a diphenol or a polyphenol;

B represents a group derived from dechlorination of a dichloride compound;

D represents a group derived from dehydrogenation of hydroxyl group of a DOPO-containing diphenol or a DOPO-containing polyphenol;

X individually represent a double bond-containing functional group or hydrogen, and not all X are hydrogen at the same time;

Y may be not present, individually represent a group of Formula (2), or be a hydrogen atom;

Formula (2)

wherein q is an integer of 0-20, and A', B, D, and X are as defined in Formula (1).

2. The phosphorus-containing compound of claim 1, wherein A and A' individually have a number average molecular weight of less than or equal to 1200.

3. The phosphorus-containing compound of claim 1, wherein A and A' individually comprise a group represented by Formula (3) to Formula (23) or a combination thereof, wherein p is an integer of 0-23:

Formula (3)

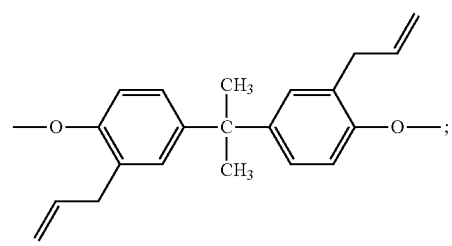

Formula (4)

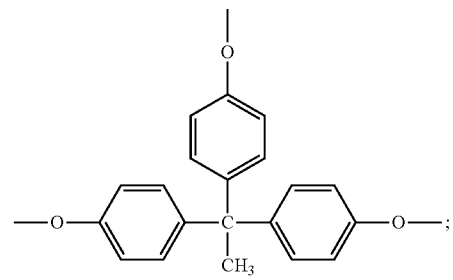

Formula (5)

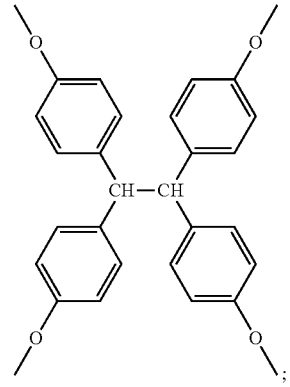

Formula (6)

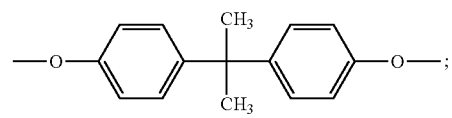

-continued

Formula (7)

—O—⟨phenylene⟩—O—;

Formula (8)

—O—⟨biphenylene⟩—O—;

Formula (9)

—O—⟨C6H4⟩—C(=O)—⟨C6H4⟩—O—;

Formula (10)

—O—⟨C6H4⟩—C(=O)—⟨C6H4⟩—C(=O)—⟨C6H4⟩—O—;

Formula (11)

—O—⟨C6H4⟩—C(CF3)2—⟨C6H4⟩—O—;

Formula (12)

—O—⟨C6H4⟩—SO2—⟨C6H4⟩—O—;

Formula (13)

—O—⟨C6H4⟩—CH2—⟨C6H4⟩—O—;

Formula (14)

—O—⟨3,5-(CH3)2-C6H2⟩—C(CH3)2—⟨3,5-(CH3)2-C6H2⟩—O—;

Formula (15)

—O—⟨2,6-(CH3)2-C6H2⟩—O—;

Formula (16)

—O—⟨3-CH3-C6H3⟩—CH2—⟨3-CH3-C6H3⟩—O—;

Formula (17)

—O—⟨3,5-(CH3)2-C6H2⟩—⟨3,5-(CH3)2-C6H2⟩—O—;

Formula (18)

—O—⟨3,5-(CH3)2-C6H2⟩—CH2—⟨3,5-(CH3)2-C6H2⟩—O—;

Formula (19)

—O—⟨C6H4⟩—O—⟨C6H4⟩—O—;

Formula (20)

—O—⟨3-CH3-C6H3⟩—O—;

Formula (21)

—O—⟨C6H4⟩—S—⟨C6H4⟩—O—;

Formula (22)

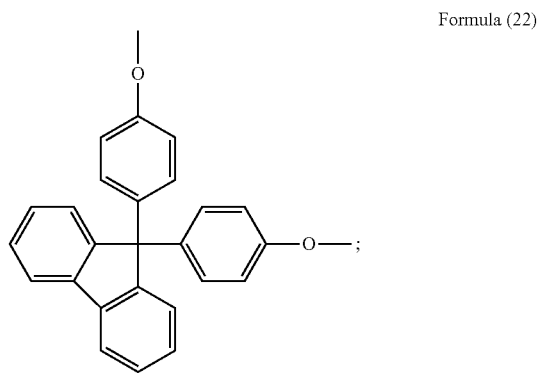

Formula (23)

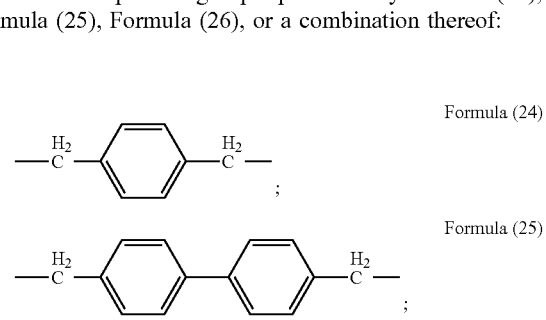

4. The phosphorus-containing compound of claim 1, wherein B comprises a group represented by Formula (24), Formula (25), Formula (26), or a combination thereof:

Formula (24)

—CH2—⟨C6H4⟩—CH2—;

Formula (25)

—CH2—⟨biphenylene⟩—CH2—;

Formula (26)

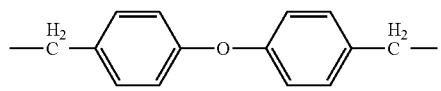

5. The phosphorus-containing compound of claim 1, wherein D comprises a group represented by Formula (27), Formula (28), or a combination thereof:

Formula (27)

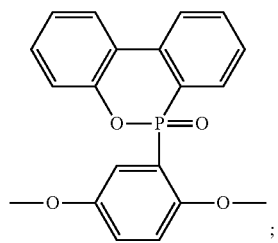

Formula (28)

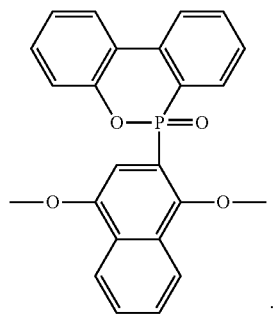

6. The phosphorus-containing compound of claim 1, wherein each X individually represents any one of Formula (29), Formula (30) and Formula (31):

Formula (29)

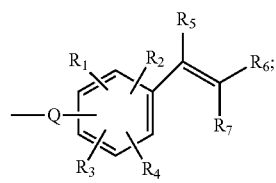

Formula (30)

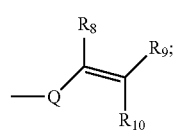

Formula (31)

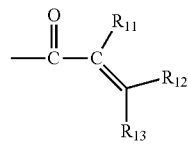

wherein $R_1$ to $R_{13}$ each represent any one or more of hydrogen, halogen, an alkyl group or a haloalkyl group, and Q is a covalent bond or a functional group with at least one carbon atom.

7. The phosphorus-containing compound of claim 1, comprising any one of Formula (32) to Formula (38):

Formula (32)
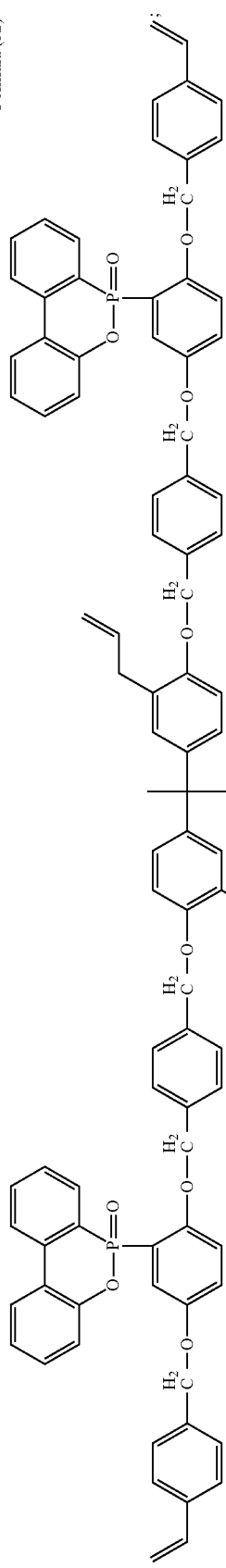
Formula (33)
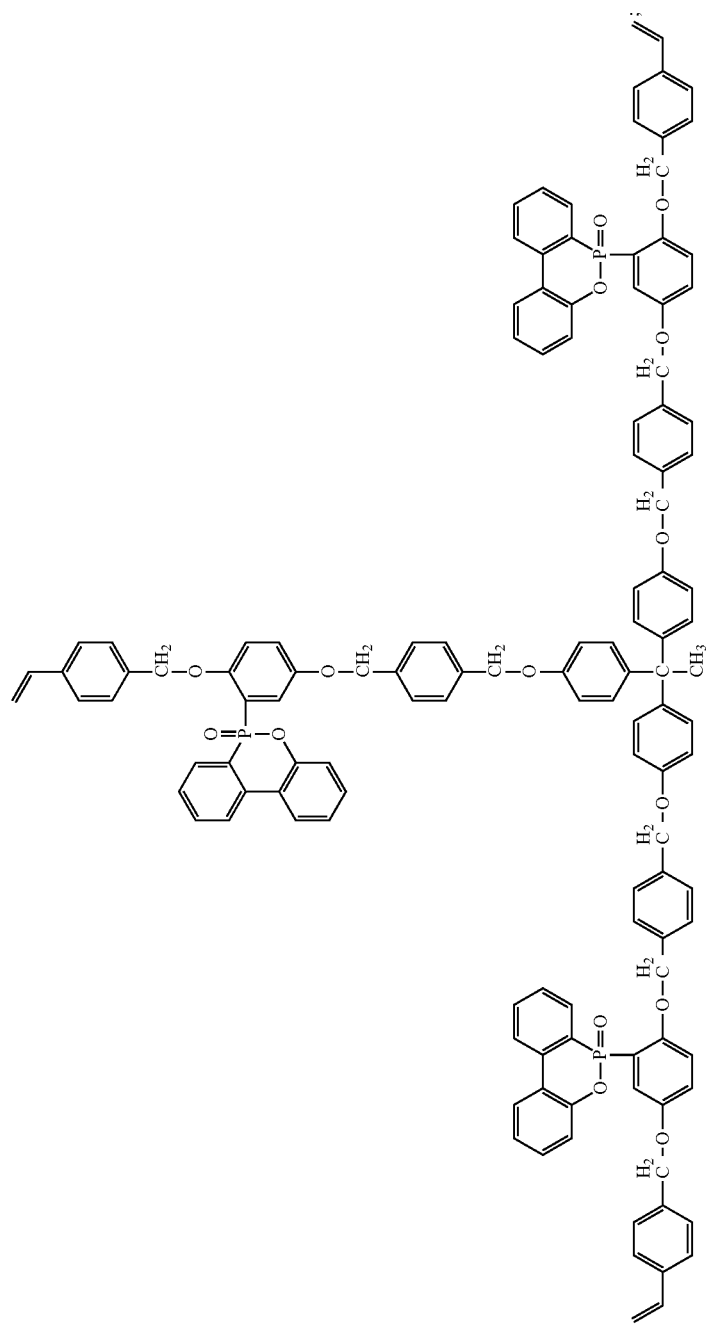

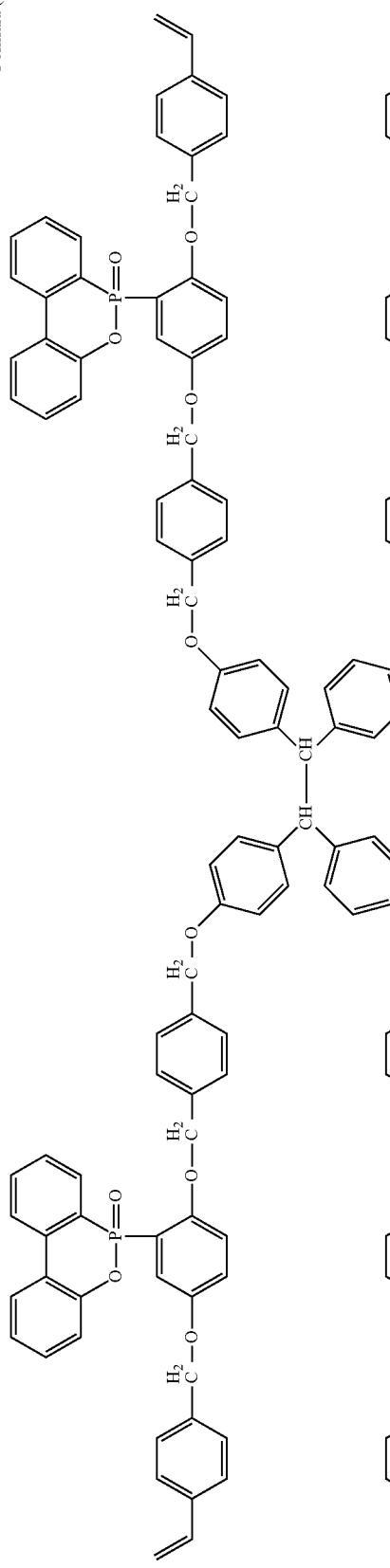
Formula (34)
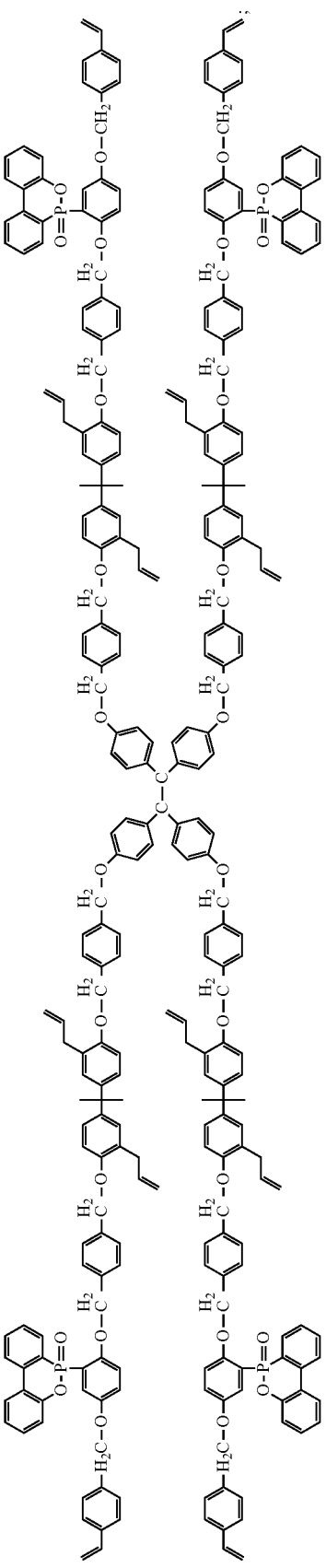
Formula (35)

-continued
Formula (36)
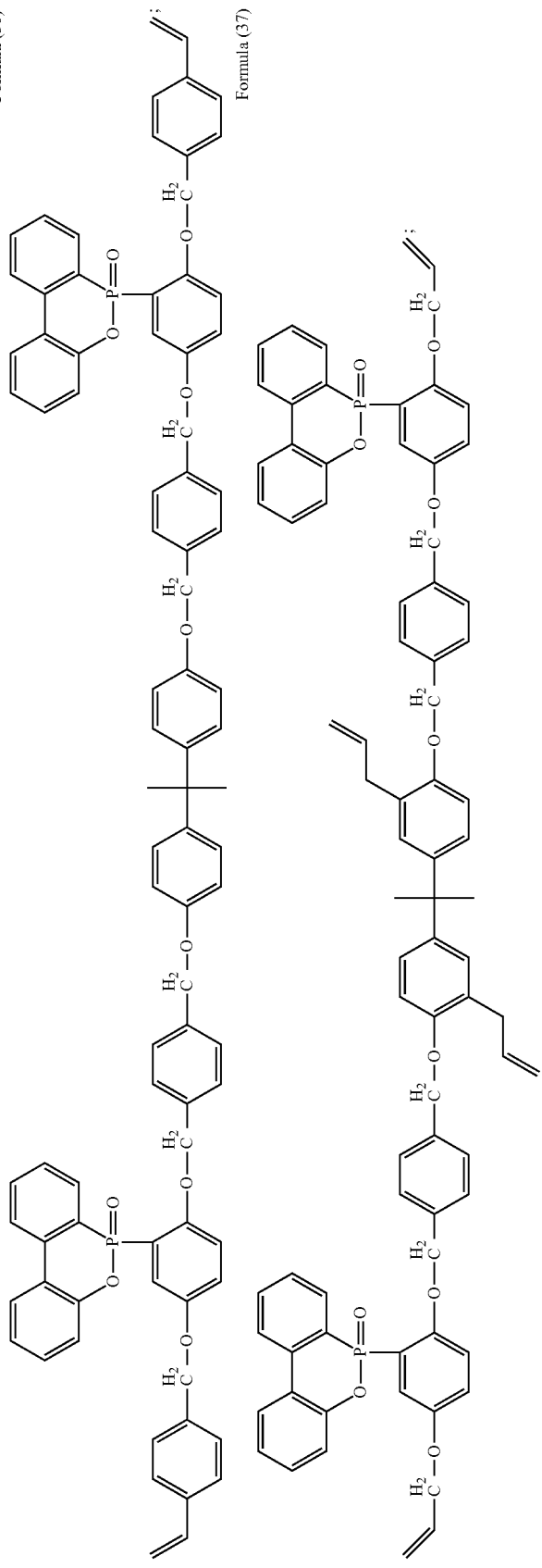
Formula (37)
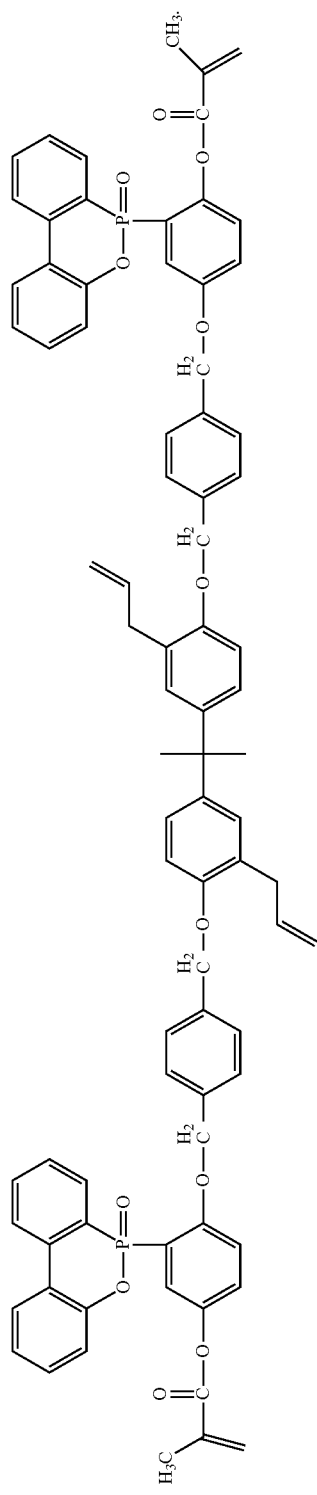
Formula (38)
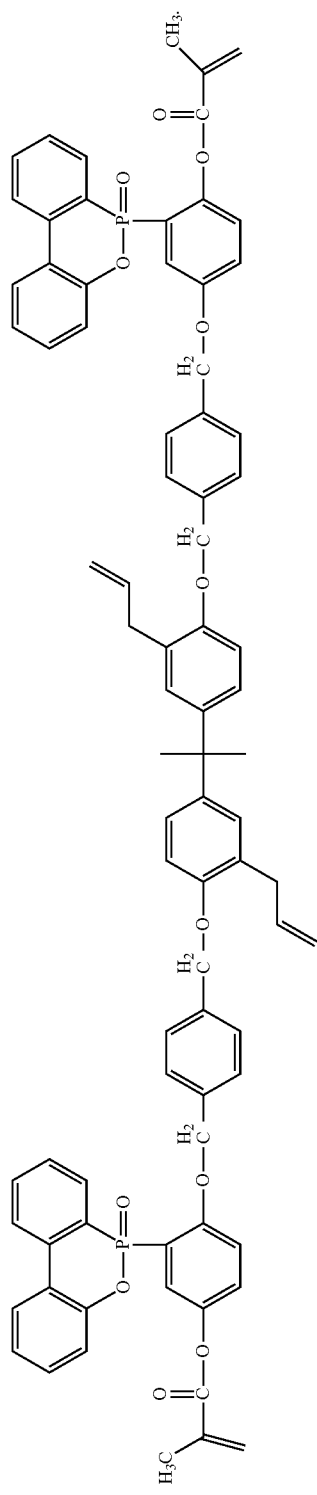

8. A phosphorus-containing flame retardant, comprising the phosphorus-containing compound of claim 1.

9. A resin composition comprising the phosphorus-containing flame retardant of claim 8 and an unsaturated bond-containing resin.

10. The resin composition of claim 9, wherein the unsaturated bond-containing resin comprises divinylbenzene, bis(vinylbenzyl) ether, 1,2-bis(vinylphenyl) ethane, triallyl isocyanurate, prepolymer of triallyl isocyanurate, triallyl cyanurate, prepolymer of triallyl cyanurate, 1,2,4-trivinyl cyclohexane, vinyl benzyl maleimide, diallyl bisphenol A, styrene, acrylate, vinyl-containing polyphenylene oxide resin, maleimide resin, polyolefin, or a combination thereof.

11. The resin composition of claim 9, further comprising epoxy resin, cyanate ester resin, phenolic resin, benzoxazine resin, styrene maleic anhydride resin, polyester, amine curing agent, polyamide, polyimide or a combination thereof.

12. The resin composition of claim 9, further comprising flame retardant, inorganic filler, curing accelerator, solvent, silane coupling agent, surfactant, coloring agent, toughening agent or a combination thereof.

13. The resin composition of claim 9, comprising 5 parts by weight to 40 parts by weight of the phosphorus-containing flame retardant and 50 parts by weight to 100 parts by weight of the unsaturated bond-containing resin.

14. An article made from the resin composition of claim 9, comprising a prepreg, a resin film, a resin-coated copper, a laminate or a printed circuit board.

15. A method of preparing a phosphorus-containing flame retardant, wherein the phosphorus-containing flame retardant comprises the phosphorus-containing compound of claim 1, the method comprising: reacting a diphenol or a polyphenol with a dichloride compound, then adding a metal salt of a DOPO-containing diphenol or a DOPO-containing polyphenol for reaction, and then adding a vinyl-containing halide for reaction, followed by filtration, so as to obtain the phosphorus-containing flame retardant.

* * * * *